United States Patent
Gaustad et al.

(10) Patent No.: US 12,491,488 B2
(45) Date of Patent: Dec. 9, 2025

(54) MICROARRAYS, HYBRIDIZATION SEALS, AND RELATED METHODS

(71) Applicant: ILLUMINA, INC., San Diego, CA (US)

(72) Inventors: Adam Gaustad, San Diego, CA (US); Jeremy Zetterberg, Coronado, CA (US); Norman Khoo, San Diego, CA (US); Jelena Stojakovic, San Diego, CA (US); Julien Cors, Männedorf (CH); Daniel Solis, Escondido, CA (US); Chandler Burke, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 1183 days.

(21) Appl. No.: 17/375,271

(22) Filed: Jul. 14, 2021

(65) Prior Publication Data

US 2022/0016593 A1 Jan. 20, 2022

Related U.S. Application Data

(60) Provisional application No. 63/051,855, filed on Jul. 14, 2020.

(51) Int. Cl.
*B01J 19/00* (2006.01)

(52) U.S. Cl.
CPC .. *B01J 19/0046* (2013.01); *B01J 2219/00313* (2013.01); *B01J 2219/00333* (2013.01); *B01J 2219/00608* (2013.01)

(58) Field of Classification Search
CPC .......... B01J 19/0046; B01J 2219/00313; B01J 2219/00333; B01J 2219/00608; B01J 2219/005; B01J 2219/00621; B01J 2219/00659; B01J 2219/00722; B01L 3/50851; B01L 3/50853; B01L 2200/025; B01L 2200/0642; B01L 2200/0689;
(Continued)

(56) References Cited

U.S. PATENT DOCUMENTS

| 6,673,620 | B1 | 1/2004 | Loeffler et al. |
| 6,946,287 | B2 | 9/2005 | Streit et al. |

(Continued)

FOREIGN PATENT DOCUMENTS

| DE | 102009059112 A1 * | 6/2011 | ............ B01L 3/5085 |
| EP | 3450958 A1 * | 3/2019 | ............ B01L 3/502 |

(Continued)

*Primary Examiner* — John Mcguirk
(74) *Attorney, Agent, or Firm* — MARSHALL, GERSTEIN & BORUN LLP

(57) ABSTRACT

Microarrays, hybridization seals and related methods. An apparatus includes a substrate including a plurality of probes and a hybridization seal. The hybridization seal includes an evaporation barrier and a layer including walls that form a grid pattern and define a plurality of sample chambers that are to receive fluid. The layer includes a first side removably coupled to the substrate and a second side that is coupled to the evaporation barrier. The evaporation barrier includes barrier sections that cover the probes and include one or more slits that allow the barrier sections to have a convex profile or a concave profile depending on an amount of the fluid within the corresponding sample chamber.

20 Claims, 19 Drawing Sheets

(58) Field of Classification Search
CPC ....... B01L 2300/049; B01L 2300/0819; B01L 2300/0829; B01L 2300/0887; B01L 2400/0638; G01N 21/6452; G01N 21/6456

See application file for complete search history.

(56) References Cited

U.S. PATENT DOCUMENTS

| | | |
|---|---|---|
| 7,772,010 B2 | 8/2010 | Dugas et al. |
| 10,632,468 B2 | 4/2020 | Kim et al. |
| 2003/0026739 A1 | 2/2003 | MacBeath et al. |
| 2004/0109793 A1* | 6/2004 | McNeely ............ B81C 1/00119 422/400 |
| 2004/0126766 A1 | 7/2004 | Amorese |
| 2009/0253582 A1 | 10/2009 | Pena et al. |
| 2010/0167943 A1 | 7/2010 | Adey et al. |
| 2010/0263096 A1 | 10/2010 | Jahnke et al. |
| 2011/0130308 A1 | 6/2011 | Luckey et al. |
| 2012/0264650 A1* | 10/2012 | Luckey ................. B01L 3/5085 506/23 |
| 2017/0060457 A1 | 3/2017 | Resch et al. |
| 2018/0016624 A1* | 1/2018 | Yue ................... B01L 3/502707 |
| 2020/0122147 A1 | 4/2020 | Joad et al. |
| 2020/0147610 A1 | 5/2020 | Hou et al. |

FOREIGN PATENT DOCUMENTS

| | | | |
|---|---|---|---|
| SG | 125967 A1 | 10/2006 | |
| WO | WO-2006102298 A1 * | 9/2006 | ............ B01L 3/0268 |
| WO | WO-2017-060457 A1 | 4/2017 | |

\* cited by examiner

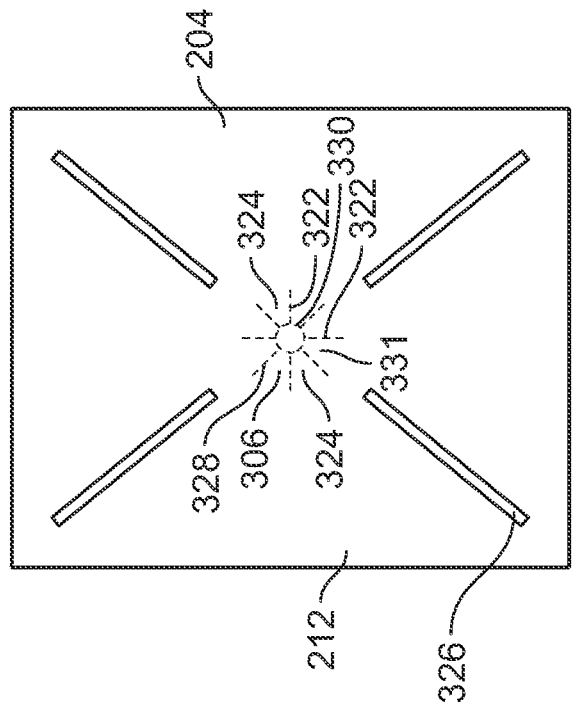
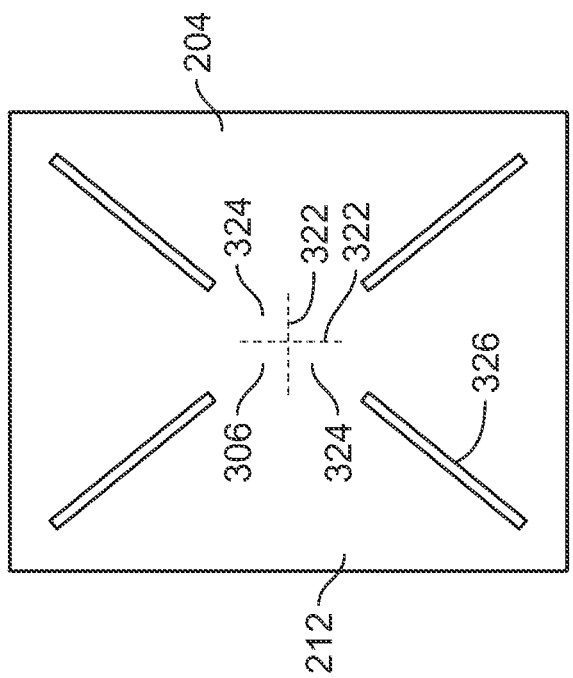

MICROARRAYS, HYBRIDIZATION SEALS, AND RELATED METHODS

RELATED APPLICATION SECTION

This application claims the benefit of and priority to U.S. Provisional Patent Application No. 63/051,855, filed Jul. 14, 2020, the content of which is incorporated by reference herein in its entireties and for all purposes.

BACKGROUND

Microarrays may be imaged by an imaging system to detect the presence of a particular target of interest. Prior to imaging the substrates, the substrates may undergo a hybridization process.

SUMMARY

Shortcomings of the prior art can be overcome and benefits as described later in this disclosure can be achieved through the provision of microarrays, hybridization seals, and related methods described herein. Various implementations of the apparatus and methods are described below, and the apparatus and methods, including and excluding the additional implementations enumerated below, in any combination (provided these combinations are not inconsistent), may overcome these shortcomings and achieve the benefits described herein.

The disclosed implementations relate to hybridization seals used with microarrays that beneficially and advantageously reduce an amount of evaporation that occurs during a hybridization process. The hybridization seals also reduce the likelihood that a portion of the microarray becomes dry from evaporation of the fluid sample(s).

In accordance with a first implementation, an apparatus includes a substrate including a plurality of probes and a hybridization seal. The hybridization seal includes an evaporation barrier and a layer including walls that form a grid pattern and define a plurality of sample chambers that are to receive fluid. The layer includes a first side removably coupled to the substrate and a second side that is coupled to the evaporation barrier. The evaporation barrier includes barrier sections that cover the probes and include one or more slits that allow the barrier sections to have a convex profile or a concave profile depending on an amount of the fluid within the corresponding sample chamber.

In accordance with a second implementation, an apparatus includes an evaporation barrier and a layer carrying the evaporation barrier and including walls that form a grid pattern. The evaporation barrier includes barrier sections that each include an inlet opening and one or more slits.

In accordance with a third implementation, an apparatus includes a substrate including a plurality of probes and a hybridization seal including an evaporation barrier and a layer. The evaporation barrier includes barrier sections that cover probes and each includes a flap and an inlet opening. The layer includes walls that form a grid pattern and define a plurality of sample chambers that are to receive fluid. The layer is removably coupled to the substrate and is coupled to the evaporation barrier. The flaps are selectively actuatable to allow access to the corresponding sample chambers.

In accordance with a fourth implementation, a method includes removing a liner from a hybridization seal and coupling the hybridization seal to a substrate including a plurality of probes to form corresponding sample chambers. The method also includes covering the probes with barrier sections of an evaporation barrier of the hybridization seal. Each of the barrier sections includes an inlet opening and (i) one or more slits or (ii) a flap that is actuatable to allow access through the inlet opening.

In accordance with a fifth implementation, a method includes dispensing fluid through inlet openings and into sample chambers formed between a substrate including probes and a hybridization seal including an evaporation barrier having barrier sections that cover the probes. The method also includes deterring evaporation of the fluid within the sample chambers by dynamically adjusting a position of the barrier sections relative to the substrate based on an amount of the fluid within the corresponding sample chambers or by covering at least a portion of the inlet openings using flaps formed by the barrier sections.

In accordance with a sixth implementation, a method includes removing a liner from a hybridization seal and coupling the hybridization seal to a substrate including a plurality of probes to form corresponding sample chambers. The method also includes covering the probes with barrier sections of an evaporation barrier of the hybridization seal. Each of the barrier sections includes an inlet opening and one or more of the following: (i) one or more slits; (ii) a flap that is actuatable to allow access through the inlet opening; and (iii) one or more channels.

In accordance with a seventh implementation, an apparatus includes a substrate and a hybridization seal. The substrate includes a plurality of probes and the hybridization seal includes an evaporation barrier and a layer including walls that form a grid pattern and define a plurality of sample chambers that are to receive fluid. The layer includes a first side removably coupled to the substrate and a second side coupled to the evaporation barrier. The evaporation barrier includes barrier sections that cover the probes and include one or more channels.

In accordance with an eighth implementation, an apparatus includes a hybridization seal, an evaporation barrier, and a layer including walls that form a grid pattern and define a plurality of sample chambers that are to receive fluid. The layer includes a first side to be removably coupled to a substrate and a second side coupled to the evaporation barrier. The evaporation barrier includes barrier sections that are to cover probes and include one or more channels.

In accordance with a ninth implementation, a method includes dispensing fluid through inlet openings and into sample chambers formed between a substrate including probes and a hybridization seal including an evaporation barrier having barrier sections that cover the probes. The method also includes flowing the fluid relative to one or more channels of the corresponding barrier sections to permit the fluid to disperse within the corresponding sample chamber.

In accordance with a tenth implementation, an apparatus includes an evaporation barrier and a layer including walls that form a grid pattern and including a first side and a second side, the second side coupled to the evaporation barrier. The evaporation barrier includes barrier sections that include one or more channels.

In accordance with an eleventh implementation, a method includes dispensing fluid through inlet openings and into sample chambers, where the sample chambers are between a substrate and a hybridization seal, where the substrate includes probes, and where the hybridization seal includes an evaporation barrier having barrier sections that cover the probes. The method also includes flowing the fluid relative to one or more channels of the corresponding barrier sections to disperse the fluid within the corresponding sample chamber.

In accordance with a twelfth implementation, a method includes dispensing fluid through inlet openings and into sample chambers, where the sample chambers are between a substrate and a hybridization seal, where the substrate includes probes, and where the hybridization seal includes an evaporation barrier having barrier sections that cover the probes. The method also includes deterring evaporation of the fluid within the sample chambers by dynamically adjusting a position of the barrier sections relative to the substrate based on an amount of the fluid within the corresponding sample chambers or by covering at least a portion of the inlet openings using flaps formed by the barrier sections.

In further accordance with the foregoing first, second, third, fourth, fifth, sixth, seventh, eighth, ninth, tenth, eleventh, and/or twelfth implementations, an apparatus and/or method may further include any one or more of the following:

In accordance with an implementation, the one or more slits extend between a perimeter of the barrier sections toward a center of the barrier sections.

In accordance with another implementation, the one or more slits are at least substantially parallel or at least substantially perpendicular relative to the walls defining the sample chambers.

In accordance with another implementation, the one or more slits are angled relative to the walls defining the sample chambers.

In accordance with another implementation, the one or more slits are positioned around at least a portion of a perimeter of each of the barrier sections.

In accordance with another implementation, the one or more slits form barrier sub-sections.

In accordance with another implementation, the barrier sub-sections have a rectangular shape.

In accordance with another implementation, the barrier sub-sections have a triangular shape.

In accordance with another implementation, a portion of each of the barrier sections is heat treated.

In accordance with another implementation, each of the barrier sections includes an inlet opening.

In accordance with another implementation, one or more of the inlet openings are located in different positions on one or more of the barrier sections.

In accordance with another implementation, the apparatus includes a first release liner coupled to a first side of the layer and a second release liner covering the evaporation barrier.

In accordance with another implementation, the apparatus includes adhesive on the first side of the layer between the first release liner and the layer.

In accordance with another implementation, the apparatus further includes a second layer and wherein the evaporation barrier is coupled between the layer and the second layer.

In accordance with another implementation, the evaporation barrier includes a tab that extends out from between the layer and the second layer.

In accordance with another implementation, the flap is arc-shaped.

In accordance with another implementation, the flap is defined by slits through the evaporation barrier.

In accordance with another implementation, the slits at least one of (i) form a cross or (ii) define the inlet opening.

In accordance with another implementation, further including dispensing fluid into one of the sample chambers and forming a convex profile or a concave profile with the corresponding barrier section based on an amount of the fluid within the corresponding sample chamber.

In accordance with another implementation, further including dynamically adjusting a position of the barrier section relative to the substrate based on the amount of the fluid within the corresponding sample chamber.

In accordance with another implementation, each barrier section includes one or more slits.

In accordance with another implementation, the method includes forming the flaps using intersecting slits.

In accordance with another implementation, the method includes forming the flaps using arc-shaped slits.

In accordance with another implementation, the evaporation barrier is substantially rigid.

In accordance with another implementation, the evaporation barrier includes polyethylene terephthalate.

In accordance with another implementation, the one or more channels are positioned around at least a portion of a perimeter of each of the barrier sections.

In accordance with another implementation, the one or more channels are at least substantially parallel or at least substantially perpendicular relative to the walls defining the sample chambers.

In accordance with another implementation, the barrier sections have a rectangular shape.

In accordance with another implementation, the apparatus further includes a second layer and the evaporation barrier is coupled between the layer and the second layer.

In accordance with another implementation, the layer includes an adhesive multi-layer and the second layer includes a barrier layer.

In accordance with another implementation, the apparatus further includes a release liner coupled to a first side of the layer.

In accordance with another implementation, the apparatus includes a release liner assembly including the release liner and a peel tab coupled to the release liner to enable the release liner to be removed from the layer.

In accordance with another implementation, the apparatus includes a second peel tab. The peel tab is coupled to the release liner adjacent a first end of the release liner and the second peel tab is coupled to the release liner adjacent a second end of the release liner.

In accordance with another implementation, the layer has an end that includes a plurality of intersecting surfaces.

In accordance with another implementation, the intersecting surfaces form a sawtooth profile.

In accordance with another implementation, the sawtooth profile allows the layer to be more easily removed from the substrate.

In accordance with another implementation, the end of the layer defines a pair of alignment holes.

In accordance with another implementation, a first sawtooth at a first edge of the layer defines one of the alignment holes and a second sawtooth at a second edge of the layer defines a second one of the alignment holes.

In accordance with another implementation, the layer, the evaporation barrier, and the second layer include alignment holes.

In accordance with another implementation, the alignment holes of the layer, the evaporation barrier, and the second layer are concentric.

In accordance with another implementation, each of the barrier sections includes an inlet opening.

In accordance with another implementation, a surface of the evaporation barrier that faces toward the substrate includes at least one of a hydrophilic coating or has hydrophilic properties.

In accordance with another implementation, the second layer includes walls that form a barrier around the corresponding inlet openings to contain a portion of the fluid protruding out of the opening.

In accordance with another implementation, the apparatus includes a frame portion that surrounds at least a portion of the evaporation barrier and further includes frangible couplings between the frame portion and the evaporation barrier.

In accordance with another implementation, each of the barrier sections includes corner vents.

In accordance with another implementation, the apparatus further includes a second layer and the evaporation barrier is coupled between the layer and the second layer.

In accordance with another implementation, the second layer is coupled to the evaporation barrier.

In accordance with another implementation, the second layer and the evaporation barrier are overmolded.

In accordance with another implementation, the one or more channels are angled relative to the walls defining the sample chambers.

In accordance with another implementation, each of the barrier sections includes an inlet opening and the one or more channels are coupled to the inlet opening.

In accordance with another implementation, an end of the one or more channels is semi-circular.

In accordance with another implementation, the one or more channels are staggered relative to one another.

In accordance with another implementation, a portion of each of the barrier sections is heat treated.

In accordance with another implementation, the heat treating of the portion of each of the barrier sections enables deformation that allows the barrier sections to have a convex profile or a concave profile depending on an amount of the fluid within the corresponding sample chamber.

In accordance with another implementation, the plurality of probes are coupled to a plurality of beads and the plurality of beads are within each of the sample chambers.

In accordance with another implementation, the second layer includes walls that form a barrier around the corresponding inlet openings.

It should be appreciated that all combinations of the foregoing concepts and additional concepts discussed in greater detail below (provided such concepts are not mutually inconsistent) are contemplated as being part of the inventive subject matter disclosed herein and may be implemented in any combination to achieve the benefits described herein. In particular, all combinations of claimed subject matter appearing at the end of this disclosure are contemplated as being part of the inventive subject matter disclosed herein and may be implemented in any combination to achieve the benefits described herein.

BRIEF DESCRIPTION OF THE DRAWINGS

FIG. 13A illustrates a plan view of another implementation of one of the barrier sections including the flap that can be used with the barrier sections disclosed.

FIG. 13B illustrates a plan view of another implementation of one of the barrier sections including the flap that can be used with the barrier sections disclosed.

DETAILED DESCRIPTION

Although the following text discloses a detailed description of implementations of methods, apparatuses and/or articles of manufacture, it should be understood that the legal scope of the property right is defined by the words of the claims set forth at the end of this patent. Accordingly, the following detailed description is to be construed as examples only and does not describe every possible implementation, as describing every possible implementation would be impractical, if not impossible. Numerous alternative implementations could be implemented, using either current technology or technology developed after the filing date of this patent. It is envisioned that such alternative implementations would still fall within the scope of the claims.

At least one aspect of this disclosure is directed toward hybridization seals and related microarray assemblies. The hybridization seals include an evaporation barrier and a layer/frame including walls that form a grid pattern and define a plurality of sample chambers. One side of the layer is removably coupled to a substrate (e.g., a microscope slide, a silicon slide) having probes and the walls form sidewalls that surround the respective probes. The walls being positioned around each probe(s) prevents or at least reduces cross-contamination between samples that may be housed within the sample chambers.

In some implementations, an evaporation barrier is coupled to a side of the layer opposite the substrate and may deter the sample(s) from evaporating during hybridization. The evaporation barrier includes barrier sections that cover each probe and have an inlet opening that allows fluid (e.g., a sample) to be loaded into the sample chamber. The inlet openings may be positioned to accommodate the fixed spacing of some multi-channel pipettes. As such, the inlet openings may sometimes be defined in the middle or another location on the barrier sections.

In some implementations, the barrier sections include one or more slits that reduce the rigidity of the barrier sections and allow a volume of the sample chamber to dynamically adjust based on, for example, an amount of fluid within the sample chamber. Thus, the barrier sections may be non-parallel to the substrate and may form a concave or a convex profile. In other implementations, the barrier sections include a flap(s) that covers the inlet opening and is actuatable to allow the fluid to be loaded into the sample chamber. Regardless if the barrier sections include the slit(s) or the flap(s), the disclosed implementations reduce an amount of evaporation of the sample that may occur during hybridization.

In other implementations, a height of the sample chamber and surface tension of the fluid deters the fluid from dispersing within the sample chamber. To reduce the surface tension of the fluid and/or to enable the fluid to disperse within the sample chamber, in some implementations, the barrier sections include one or more channels.

Figure 1:
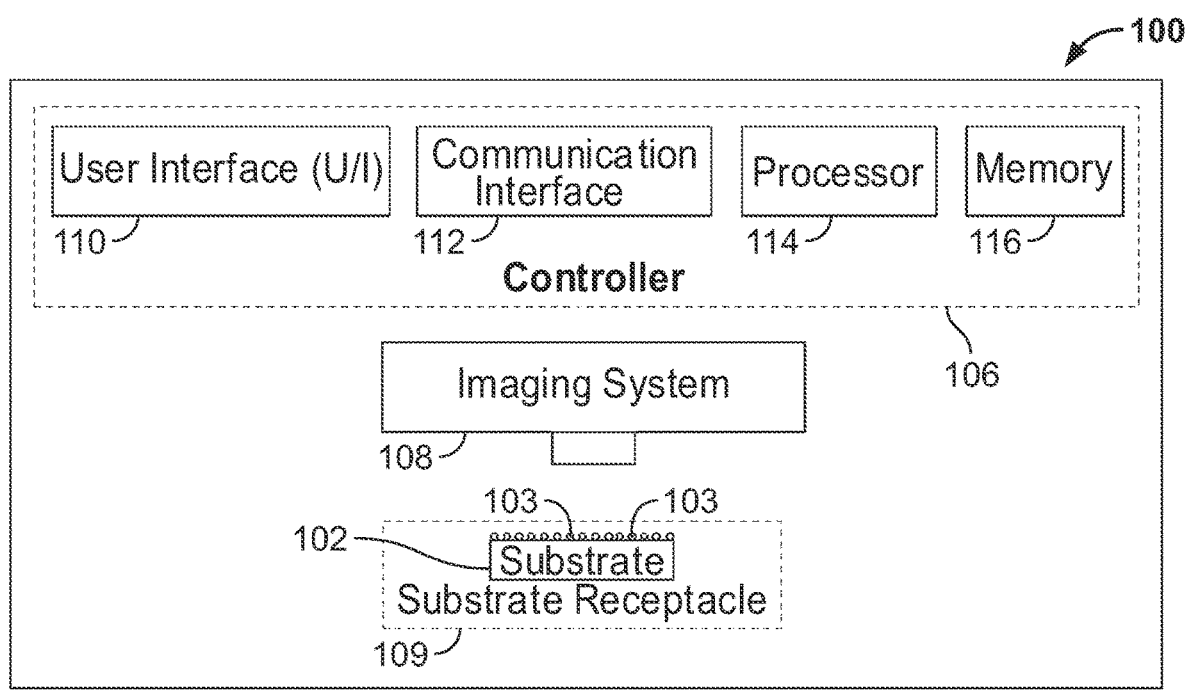
FIG. 1 illustrates a schematic diagram of an implementation of a system in accordance with the teachings of this disclosure.

FIG. 1 illustrates a schematic diagram of an implementation of a system 100 in accordance with the teachings of this disclosure. The system 100 can be used to perform an analysis on one or more samples of interest. In the implementation shown, the system 100 is adapted to receive a substrate 102 including a plurality of sites or separate beads 103 that are used to detect the presence of a particular target molecule in a sample on the substrate 102. The substrate 102 may be a portion of a microarray assembly 200 (see, FIG. 2) including a hybridization seal 202 (see, FIG. 2) and/or a microarray assembly (see, FIG. 17) including a hybridization seal 1701 (see, FIG. 17) as further disclosed below. The system 100 also includes a controller 106 and an imaging system 108. The controller 106 is electrically and/or communicatively coupled to the imaging system 108 and is adapted to cause the imaging system 108 to perform various functions as disclosed herein.

The substrate 102 carries one or more samples of interest (e.g., an analyte) and may be receivable in a substrate receptacle 109. In some implementations, the substrate 102 includes the sites or separate beads 103 each having a probe molecule(s) or a population of probe molecules on different locations on the substrate 102 allowing the probe molecule(s) to be individually accessed. For example, a million probes may be provided per bead and each sample chamber may include millions of the beads (e.g., 10.8 million beads). Put another way, thousands of probes, millions of probes, billions of probes, etc. may be provided per sample chamber. If beads are provided on the substrate 102, the beads may be coated with DNA oligonucleotides that binds with DNA within the sample. The sites or separate beads 103 may be referred to as probes 103. In some implementations, the probes are printed on a patch and/or on the substrate 102.

Regardless of how the substrate 102 carries the probe molecule(s), an identifiable label (e.g., a fluorescent marker) is attached to the probe molecule(s) to allow the presence of a particular target molecule within the sample to be determined. In some such implementations, one or more of the identifiable labels have a unique fluorescent label that emits a color when excited. The color (or absence thereof) is used to detect the presence of the target molecule within the sample. In the implementation shown, the imaging system 108 is adapted to excite one or more of the identifiable labels (e.g., a fluorescent label) and thereafter obtain image data for the identifiable labels. The labels may be excited by incident light and/or a laser and the image data may include one or more colors emitted by the respective labels in response to the excitation. The image data (e.g., detection data) may be analyzed by the system 100. The imaging system 108 may be a fluorescence spectrophotometer including an objective lens and/or a solid-state imaging device. The solid-state imaging device may include a charge coupled device (CCD) and/or a complementary metal oxide semiconductor (CMOS).

Referring to the controller 106, in the implementation shown, the controller 106 includes a user interface 110, a communication interface 112, one or more processors 114, and a memory 116 storing instructions executable by the one or more processors 114 to perform various functions including the disclosed implementations. The user interface 110, the communication interface 112, and the memory 116 are electrically and/or communicatively coupled to the one or more processors 114.

In an implementation, the user interface 110 is adapted to receive input from a user and to provide information to the user associated with the operation of the system 100 and/or an analysis taking place. The user interface 110 may include a touch screen, a display, a key board, a speaker(s), a mouse, a track ball and/or a voice recognition system. The touch screen and/or the display may display a graphical user interface (GUI).

In an implementation, the communication interface 112 is adapted to enable communication between the system 100 and a remote system(s) (e.g., computers) via a network(s). The network(s) may include the Internet, an intranet, a local-area network (LAN), a wide-area network (WAN), a coaxial-cable network, a wireless network, a wired network, a satellite network, a digital subscriber line (DSL) network, a cellular network, a Bluetooth connection, a near field communication (NFC) connection, etc. Some of the communications provided to the remote system may be associated with analysis results, imaging data, etc. generated or otherwise obtained by the system 100. Some of the communications provided to the system 100 may be associated with a fluidics analysis operation, patient records, and/or a protocol(s) to be executed by the system 100.

The one or more processors 114 and/or the system 100 may include one or more of a processor-based system(s) or a microprocessor-based system(s). In some implementations, the one or more processors 114 and/or the system 100 includes one or more of a programmable processor, a programmable controller, a microprocessor, a microcontroller, a graphics processing unit (GPU), a digital signal processor (DSP), a reduced-instruction set computer (RISC), an application specific integrated circuit (ASIC), a field programmable gate array (FPGA), a field programmable logic device (FPLD), a logic circuit and/or another logic-based device executing various functions including the ones described herein.

The memory 116 can include one or more of a semiconductor memory, a magnetically readable memory, an optical memory, a hard disk drive (HDD), an optical storage drive, a solid-state storage device, a solid-state drive (SSD), a flash memory, a read-only memory (ROM), erasable programmable read-only memory (EPROM), electrically erasable programmable read-only memory (EEPROM), a random-access memory (RAM), a non-volatile RAM (NVRAM) memory, a compact disc (CD), a compact disc read-only memory (CD-ROM), a digital versatile disk (DVD), a Blu-ray disk, a redundant array of independent disks (RAID) system, a cache and/or any other storage device or storage disk in which information is stored for any duration (e.g., permanently, temporarily, for extended periods of time, for buffering, for caching).

Figure 2:
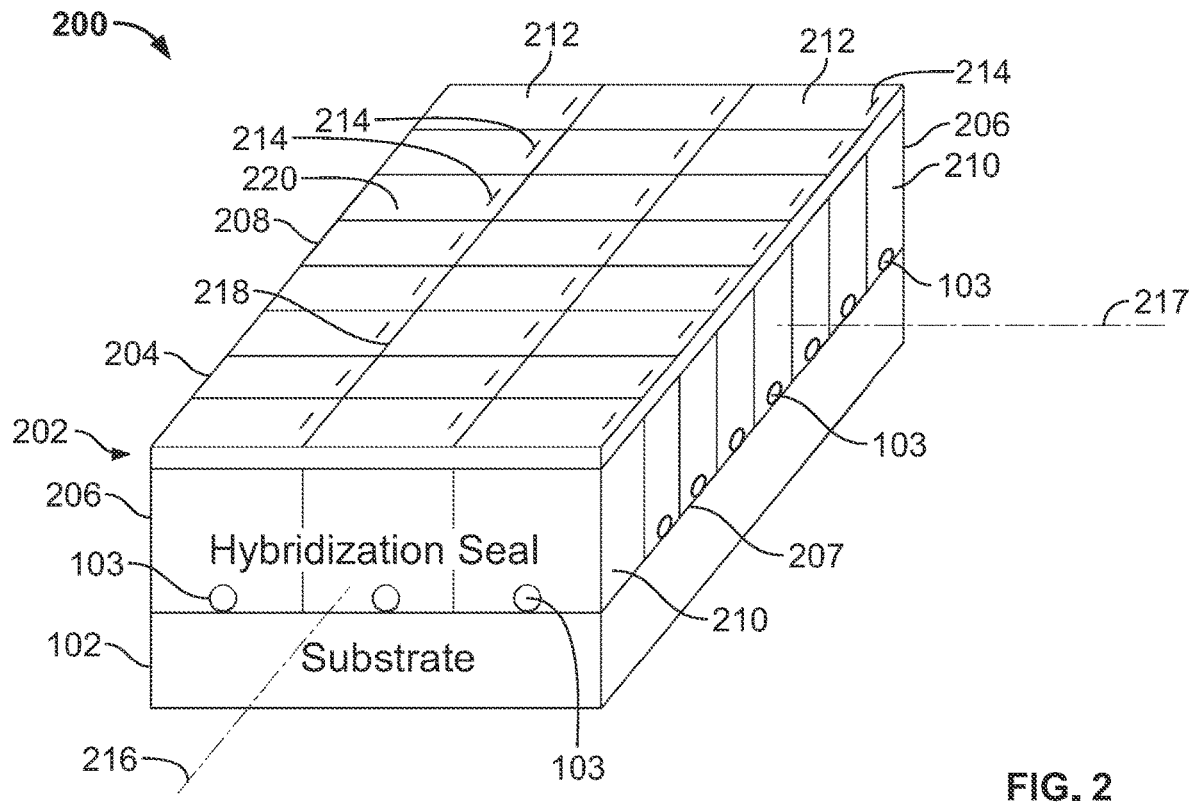
FIG. 2 illustrates an isometric view of an implementation of a microarray assembly in accordance with the teachings of this disclosure.

FIG. 2 illustrates an isometric view of an implementation of the example microarray assembly 200 in accordance with the teachings of this disclosure. In the implementation shown, the assembly 200 includes the substrate 102 including the probes 103 and the hybridization seal 202 including an evaporation barrier 204 and a layer(s) 206. The evaporation barrier 204 may comprise a polymer and is shown being carried by or otherwise coupled to the layer 206. In some implementations, the evaporation barrier 204 includes polyethylene, polyester, polyethylene terephthalate, vinyl, polypropylene, or combinations thereof. The frame 206 may be made of multiple sublayers that are laminated together that can be referred to as an adhesive multilayer.

The layer 206 is removably coupled to the substrate 102 via adhesive 207 and includes walls 208 that form a grid pattern and define a plurality of sample chambers 210. The adhesive 207 may be or be associated with tape, double-sided tape, a carrier, glue, an acrylic adhesive, a silicone adhesive, and/or an epoxy that provide a removable water tight seal and are compatible with reagents being used. In the implementation shown, the walls 208 form twenty four rectangular sample chambers 210. However, the assembly 200 may include a different number of the sample chambers 210 and/or the sample chambers 210 may have a different shape. For example, the assembly 200 or any of the assemblies disclosed herein may include forty eight sample chambers 210 or a different number of sample chambers (e.g., 12, 36, 40). The walls 208 that separate the sample chambers 210 may prevent or reduce samples contained within the respective sample chambers 210 from cross-contaminating.

The evaporation barrier 204 includes barrier sections 212 where each barrier section 212 covers probes 103 and one of the sample chambers 210 and may limit evaporation of the sample(s) during a hybridization step of an assay workflow. In the implementation shown, the barrier sections 212 include one or more slits 214 that allow the barrier sections 212 to have a convex profile or a concave profile depending on an amount of fluid within the corresponding sample chambers 210. For example, if a greater amount of fluid is contained within the sample chamber 210, the corresponding barrier section 212 may expand upward and have a convex shape to accommodate the greater fluid volume within the sample chamber 210 and, if a lesser amount of fluid is contained within the sample chamber 210, the corresponding barrier section 212 may sag downward and have a concave shape to accommodate the lesser fluid volume within the sample chamber 210. When the barrier sections 212 sag downward, the barrier sections 212 may urge the fluid within the sample chambers 210 to cover the probes 103 and/or to distribute the evaporation volume loss across a larger surface area of the probes 103, thereby preventing or delaying the fluid from evaporating entirely under, for example, an inlet opening of the barrier sections 212. Put another way, the slits 214 increase the flexibility of the barrier sections 212 and reduce adverse effects of evaporation. Additionally or alternatively, the barrier sections 212 may be heat treated or undergo another treatment such as laser ablation to increase the flexibility of the barrier sections 212 (see, for example, FIGS. 31 and 32). However, the barrier sections 212 may be treated in different ways including applying one or more hydrophobic or hydrophilic treatments to the barrier sections 212. Some of these treatments include providing an adhesion promotor(s), a coating(s) such as silicone(s), silane(s), phosphate(s), polyolefin(s), epoxy or epoxies, energy treatment(s), plasma treatment, corona treatment, etching, etc. In other implementations, the barrier section 212 may be relatively rigid and formed of, for example, polyethylene terephthalate (PET) and the slits 214 may be channels (see, for example, FIGS. 17-31). In some implementations, the channels permit the fluid received within the corresponding sample chamber 210 to disperse within the sample chamber 210, improve a rate of dispersion, increase a rate of dispersion, allow the fluid to disperse within the sample chamber 210, and/or enable the fluid to disperse within the sample chamber 210.

In the implementation shown, each barrier section 212 includes one slit 214 that is at least substantially parallel to the walls 208 that are arranged along a longitudinal axis 216 of the hybridization seal 202 and at least substantially perpendicular to the walls 209 arranged along a transverse axis 217 of the hybridization seal 202. As set forth herein, the phrase "substantially parallel" means about less than or equal to 5° from parallel including being parallel itself and/or accounts for manufacturing tolerances and the phrase "substantially perpendicular" means about less than or equal to 5° from perpendicular including being perpendicular itself and/or accounts for manufacturing tolerances. Moreover, the slits 214 may be formed as continuous slits that intersect at least one other slit and/or as discontinuous slits that do not intersect another slit. While the slits 214 are shown arranged in a particular way in FIG. 2, one or more of the barrier sections 212 may include more than one slit 214 and/or the slit(s) 214 may be differently arranged. For example, the slit 214 may be at least substantially perpendicular relative to the longitudinal axis 216 and/or one or more slits 214 may extend between a perimeter 218 of the barrier sections 212 toward a center 220 of the barrier sections 212 (see, FIGS. 4-8). In yet other examples, the slit(s) 214 may be angled relative to the walls 208 defining the sample chambers 210 (see, FIGS. 5, 7, 8) and/or the slit(s) 214 may be positioned around the perimeter of each of the barrier sections 212 (see, FIGS. 5, 6, 7). As set forth herein, the phrase "around the perimeter" means that the slits are located on two or more sides of the perimeter of each of the barrier sections 212. Other arrangements may also be suitable.

Figure 3:
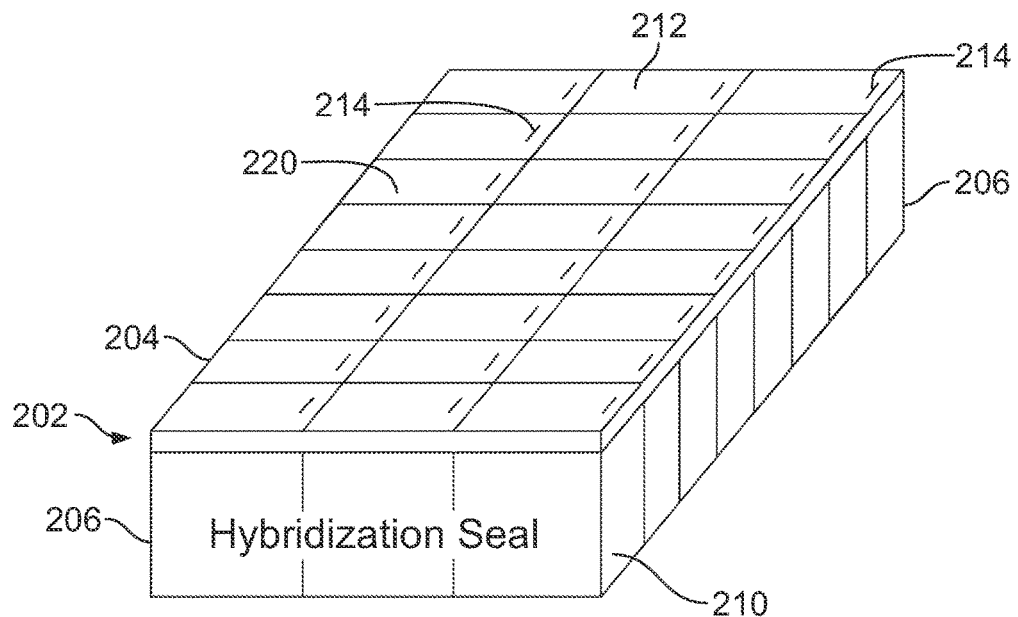
FIG. 3 illustrates a cross-sectional view of a hybridization seal of the microarray assembly of FIG. 2.

FIG. 3 illustrates an isometric view of the hybridization seal 202 of the microarray assembly 200 of FIG. 2. In the implementation shown, the hybridization seal 202 includes the evaporation barrier 204 having the barrier sections 212 that each define a slit 214.

Figure 4:
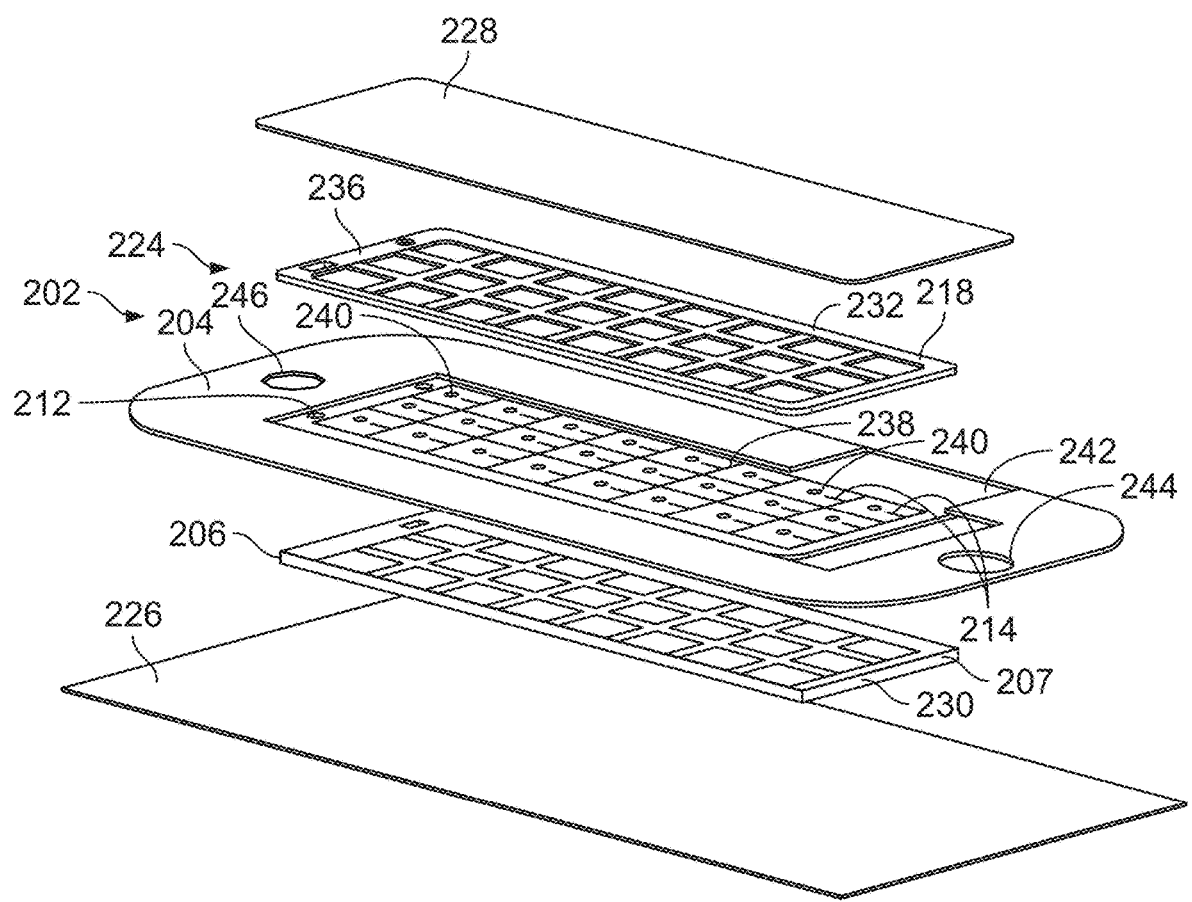
FIG. 4 illustrates an isometric expanded view of an implementation of the hybridization seal assembly that can be used with the hybridization seal of FIGS. 2 and 3.

FIG. 4 illustrates an isometric expanded view of an implementation of a hybridization seal assembly 224 that can be used with the hybridization seal 202 of FIGS. 2 and 3. In the implementation shown, the hybridization seal assembly 224 includes the hybridization seal 202 including the evaporation barrier 204, the layer 206, and first and second release liners 226, 228 that are couplable to respective sides 230, 232 of the layer 206 and a second layer 236 further disclosed below. The adhesive 207 is positioned between the first release liner 226 and the layer 206 and the second release liner 228 covers a portion 238 of the evaporation barrier 204.

In contrast to the layer 206 disclosed in FIGS. 2 and 3, the hybridization seal assembly 224 of FIG. 4 includes the layer 206 and the second layer 236 between which the evaporation barrier 204 is coupled. The first layer 206 may be an adhesive, an adhesive multilayer or adhesive and polymer film combination and the second layer 236 may be a spillover barrier including an adhesive multilayer or adhesive and polymer film combination. Moreover, adhesive may be provided between the first layer 206 and the evaporation barrier 204, between the evaporation barrier 204 and the second layer 236, and/or between the second layer 236 and the second release liner 228. The adhesive may be associated with tape (single sided, doubled sided), glue, etc.

Referring to the evaporation barrier 204 of FIG. 4, in the implementation shown, the evaporation barrier 204 may have a thickness of between about 1 one thousandth of an inch (mil) and about 7 mils and each of the barrier sections 212 includes an inlet opening 240 to allow fluid to be dispensed into the corresponding sample chambers 210. Other thicknesses for the evaporation barrier 204 may also be suitable. The inlet opening 240 may be circular and sized to correspond to an outer diameter of a pipet. The inlet openings 240 may all be centrally located on the corresponding barrier sections 212. Alternatively, the inlet openings 240 may be in positions on the barrier sections 212 to correspond to spacing of a multi-channel pipet having 8 tips, for example.

The inlet openings 240 allow fluid within the sample chambers 210 to be exposed to the environment, thereby allowing the sample to evaporate at an increased rate beneath the inlet opening 240. If evaporation occurs, the probes 103 beneath the inlet opening 240 may become dry, causing a gradient across the probes 103 that may reduce assay performance and/or may change a concentration of DNA within the sample chamber 210. However, advantageously, the slits 214 of the disclosed implementations allow the position of the barrier sections 212 to dynamically adjust based on an amount of fluid within the sample chamber 210, thereby deterring evaporation.

The evaporation barrier 204 also includes a tab 242 that extends out from between the layer 206 and the second layer 236 and may be grasped by an individual and pulled to uncouple the hybridization seal 202 from the substrate 102 after the hybridization of an assay workflow. The evaporation barrier 204 also includes differently shaped alignment features 244, 246 that align with a device used when assembling the hybridization seal assembly 224 and/or coupling the hybridization seal assembly 224 to the substrate 102, for example. One of the alignment features 244 is shown being circular and another of the alignment features 246 is shown being octagonal. However, the alignment features 244, 246 may be different shapes and/or may be omitted.

Figure 5:
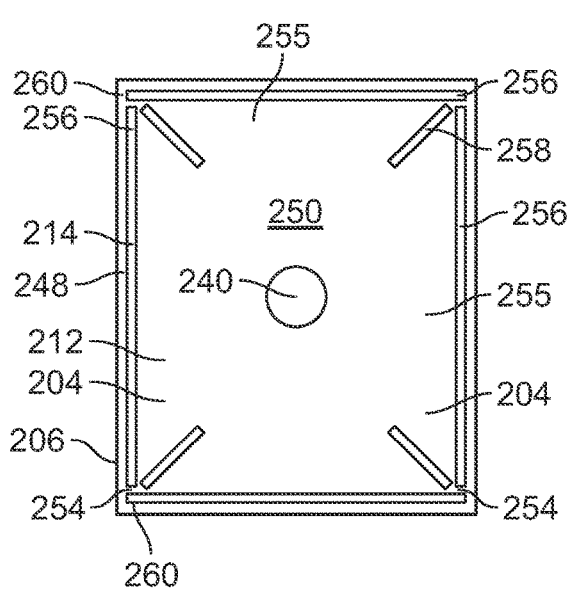
FIG. 5 illustrates a plan view of an implementation of one of the barrier sections that can be used with the hybridization seals of FIGS. 2, 3, and/or 4.

FIG. 5 illustrates a plan view of an implementation of one of the barrier sections 212 that can be used with the hybridization seals 202 of FIGS. 2, 3, and/or 4. In the implementation shown, the barrier section 212 includes a plurality of the slits 214 and the inlet opening 240. The slits 214 of FIG. 5 are discrete slits 214 in that the slits 214 do not intersect each other. As such, a perimeter barrier portion 248 is connected to a central barrier portion 250 via connecting barrier portions 254. The barrier section 212 includes barrier sub-sections 255 having a triangular shape and are defined by perimeter slits 256 that extend along a perimeter of the barrier section 212 and central slits 258 that extend between the barrier section 212 and a center of the barrier section 212. The central slits 258 are shown extending toward the center of the barrier sections 212 at an angle of about 45°. However, other angles may also be suitable (e.g., 20°, 27°, 35°) and/or one or more of the slits 214 may have a different angle relative to other ones of the slits 214 (see, for example, FIG. 8).

The slits 256 and/or 258 may act as vents to release gas (air) from the sample and/or the sample chamber 210. If air is contained within the sample and/or the sample chamber 210, the air may prevent DNA within the sample from binding with the corresponding probes 103 and/or may minimize, and in some instances even prevent, image data from being obtained from the area of the probes 103 where the DNA did not bind.

In the implementation shown, the barrier sub-sections 255 are connected to the perimeter barrier portion 248 at corners 260 of the barrier section 212 via the connecting barrier portions 254. However, the slits 214 may be differently arranged to allow the perimeter barrier portion 248 to be connected to the central barrier portion 250 at a location other than at the corners 260. For example, the slits 214 along each leg of the perimeter of the barrier section 212 may include more than one slit 214 (see, for example, FIGS. 6 and 7) allowing the perimeter barrier portion 248 to be connected to the central barrier portion 250 in different locations than shown.

Figure 6:
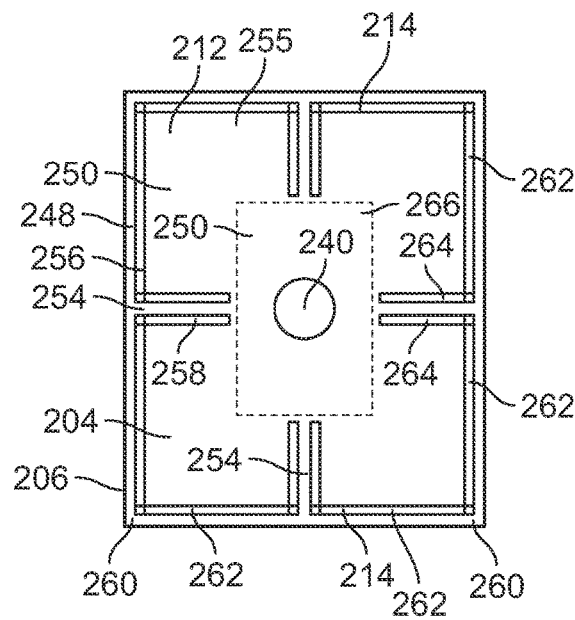
FIG. 6 illustrates a plan view of another implementation of one of the barrier sections that can be used with the hybridization seals of FIGS. 2, 3, and/or 4.

FIG. 6 illustrates a plan view of an implementation of one of the barrier sections 212 that can be used with the hybridization seals 202 of FIGS. 2, 3, and/or 4. In contrast to the barrier section 212 of FIG. 5, the slits 214 of the barrier section 212 of FIG. 6 are arranged to allow the barrier sub-sections 255 to have a rectangular shape. The connecting barrier portions 254 are centrally disposed on each leg of the barrier section 212 and extend between the perimeter barrier portion 248 and the central barrier portion 250 at least substantially perpendicularly. Other arrangements may also be suitable.

To form the barrier sub-sections 255 having the rectangular shape, each leg of the barrier section 212 includes a pair of perimeter sub-slits 262 and a pair of central sub-slits 264 between which the connecting barrier portion 254 extends. The perimeter sub-slits 262 are coupled to one of the central sub-slits 264 and together form a rectangular barrier portion 266 that may drop downward relative to the perimeter barrier portion 248 and form a flat portion of the evaporation barrier 204. The rectangular barrier portion 266 may move outwardly or inwardly relative to the substrate 102 to which the hybridization seal 202 is connected based on an amount of fluid contained within the corresponding sample chamber 210.

Figure 7:
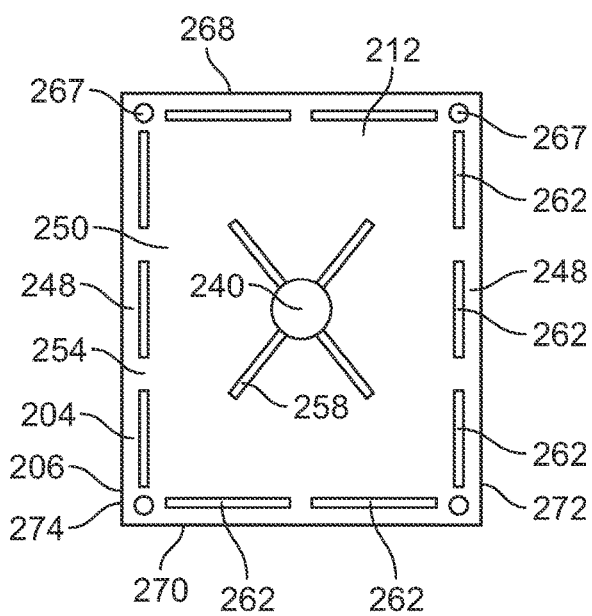
FIG. 7 illustrates a plan view of another implementation of one of the barrier sections that can be used with the hybridization seals of FIGS. 2, 3, and/or 4.

FIG. 7 illustrates a plan view of an implementation of one of the barrier sections 212 that can be used with the hybridization seals 202 of FIGS. 2, 3, and/or 4. In contrast to the barrier section 212 of FIGS. 5 and 6, the barrier section 212 includes the two perimeter sub-slits 262 on top and bottom legs 268, 270 of the barrier section 212, three perimeter sub-slits 262 on right and left legs 272, 274 of the barrier section 212, and central slits 258 that connect with the inlet opening 240. Also, in the implementation shown, the barrier section 212 includes corner vents 267 that are circular. The corner vents 267 may be used to vent gas from the sample and/or the corresponding sample chamber 210. In other implementations, the corner vents 267 may be in a different location, have a different shape, or may be omitted.

Figure 8:
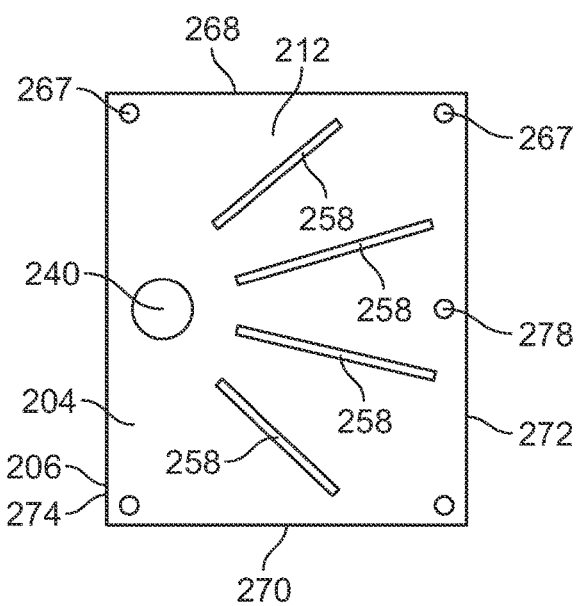
FIG. 8 illustrates a plan view of another implementation of one of the barrier sections that can be used with the hybridization seals of FIGS. 2, 3, and/or 4.

FIG. 8 illustrates a plan view of another implementation of one of the barrier sections 212 that can be used with the hybridization seals 202 of FIGS. 2, 3, and/or 4. In contrast to the barrier sections 212 of FIGS. 5, 6, and 7, the barrier section 212 of FIG. 8 does not include the perimeter slits 256 but includes the inlet opening 240 that is off-center and positioned toward the left leg 274 of the barrier section 212 and includes the central slits 258 that extend radially outward from the inlet opening 240 toward the top, bottom, and right legs 268, 270, and 272 of the barrier section 212. Also, in the implementation shown, the barrier section 212 includes the corner vents 267 and a central vent 278 disposed opposite the inlet opening 240 on the right leg 272.

Figure 9:
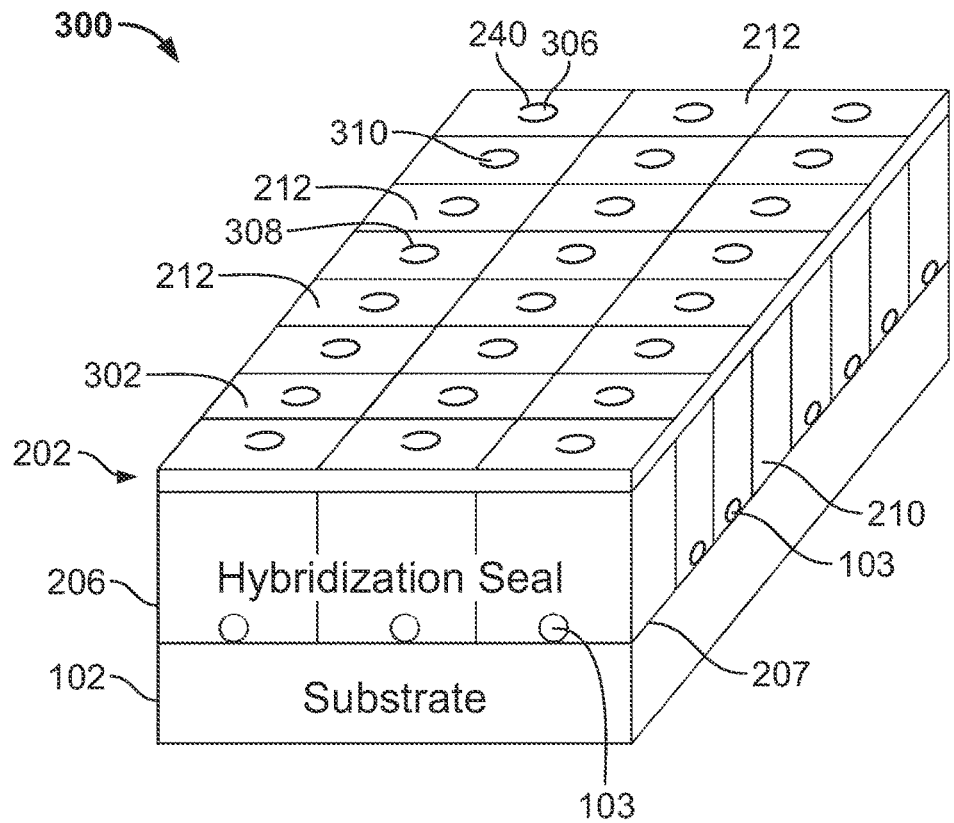
FIG. 9 illustrates an isometric view of another implementation of a microarray assembly in accordance with the teachings of this disclosure.

FIG. 9 illustrates an isometric view of another implementation of a microarray assembly 300 in accordance with the teachings of this disclosure. The assembly 300 includes the substrate 102 and the hybridization seal 202 including an evaporation barrier 302 and the layer 206. In contrast to the evaporation barrier 204 disclosed above, the evaporation barrier 302 of FIG. 9 does not include the slits 214 but instead each barrier section 212 includes a flap 306 that covers a corresponding inlet opening 240. In the implementation shown, the flaps 306 are formed by arc-shaped slits 308 through the evaporation barrier 302 and a flap-connecting portion 310 that connects the flap 306 and the remainder of the barrier section 212. The flap-connecting portion 310 biases the flap 306 toward the covering position. The flaps 306 may cover the inlet openings 240 to limit evaporation of the sample(s) during hybridization of the assay workflow. In operation, the flaps 306 are actuatable between a covering position that covers the inlet opening 240 and an open position that allows access to the corresponding sample chamber 210 to allow fluid to be dispensed into the sample chamber 210. The flap may be depressed in different ways including using a pipet (see, for example, FIGS. 11 and 12).

Figure 10:
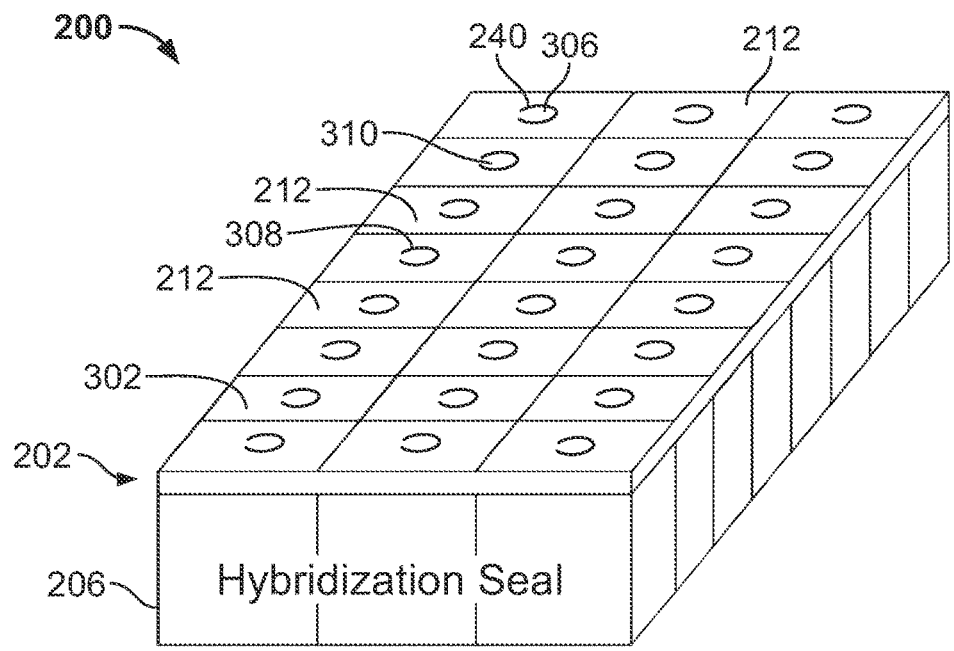
FIG. 10 illustrates an isometric view of the hybridization seal of the microarray assembly of FIG. 9.

FIG. 10 illustrates an isometric view of the hybridization seal 202 of the microarray assembly 300 of FIG. 9. In the implementation shown, the hybridization seal 202 includes the evaporation barrier 302 having the barrier sections 212 that each include the flap 306 and the inlet opening 240.

Figure 12:
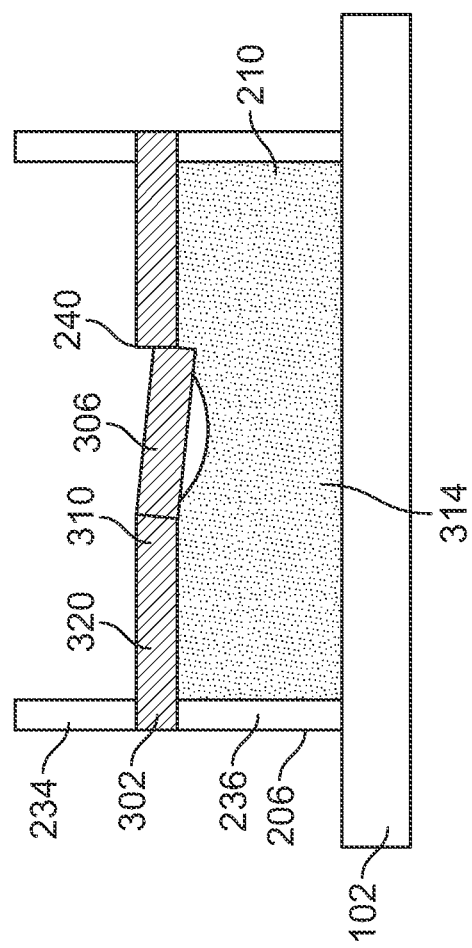
FIG. 12 illustrates a cross-sectional view of the hybridization seal of FIG. 9 and the sample chamber of the microarray assembly filled with fluid.
Figure 11:
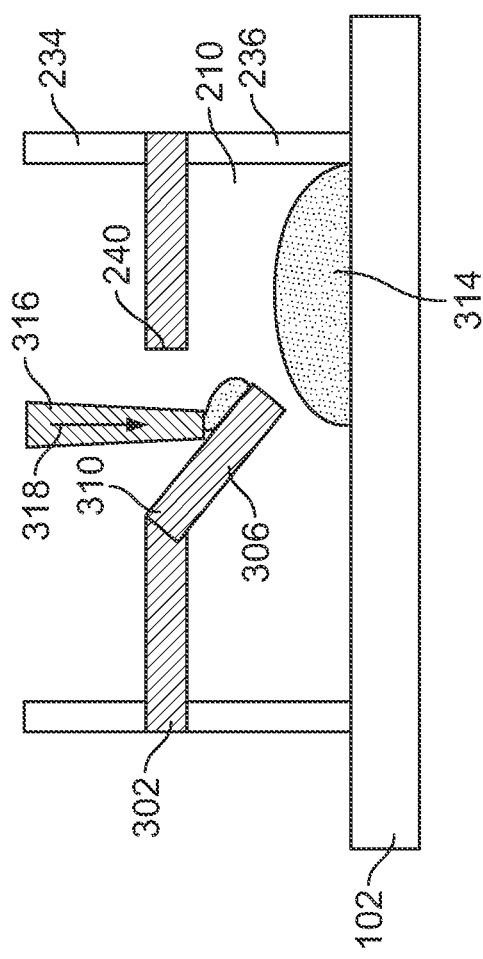
FIG. 11 illustrates a cross-sectional view of the hybridization seal of FIG. 9 and the process of dispensing fluid within a sample chamber of the microarray assembly.

FIGS. 11 and 12 illustrate a cross-sectional view of the evaporation barrier 302 of FIG. 9 and the process of dispensing fluid 314 within the sample chamber 210.

Referring to FIG. 11, a pipet 316 is shown urging the flap 306 in a direction generally indicated by arrow 318 into the sample chamber 210 and toward the substrate 102 allowing access to the sample chamber 210. The pipet 316 dispenses the fluid 314 through the inlet opening 240 into the sample chamber 210. When the pipet 316 is removed, the flap-connecting portion 310 biases the flap 306 in a direction generally opposite that of the arrow 318 to at least substantially cover the inlet opening 240.

FIG. 12 shows the sample chamber 210 filled with the fluid 314 and the flap 306 being at least substantially flush with a remainder 320 of the evaporation barrier 302. As set forth herein, the "phrase substantially flush" means that the flap 306 is within about less than or equal to 15° of flush with the remainder 320 of the evaporation barrier 302. The sample chamber 210 may contain about 15 microliters (μL) and about 20 μL of fluid. However, the sample chamber 210 may be any other size and/or may contain any other amount of fluid depending on the application.

FIG. 13A illustrates a plan view of another implementation of one of the barrier sections 212 including the flap 306 that can be used with the barrier sections 212 disclosed. In the example shown, the flap 306 is defined by intersecting slits 322 through the evaporation barrier 204. The slits 322 form a cross and four flap sections 324 that are triangularly shaped. Other slit arrangements may prove suitable to form the flap 306. For example, a single long slit may be used to form the flap 306, two intersecting slits may be used, and/or three slits may be used that intersect at, for example, about 120° relative to one another. In the example shown, the barrier section 212 includes channels 326 that permit the fluid received within the sample chamber 210 to disperse within the sample chamber 210. For example, the channels 326 may permit the fluid to flow relative to the channels 326, thereby permitting the fluid to disperse within the sample chamber 210, improving a rate of dispersion, increasing a rate of dispersion, allowing the fluid to disperse within the sample chamber 210, and/or enabling the fluid to disperse within the sample chamber 210. The fluid may flow along a bottom surface of the barrier section 212 and/or a plane defined by the bottom surface of the barrier section 212 and along the channels 326. The channels 326 may be referred to as fluidic channels.

FIG. 13B illustrates a plan view of another implementation of one of the barrier sections 212 including the flaps 306 that can be used with the barrier sections 212 disclosed. The barrier section 212 of FIG. 13B is similar to the barrier section 212 of FIG. 13A. However, in contrast, the barrier section 212 of FIG. 13B includes slits 328 having distal ends 330 that define the inlet opening 240 and form a radial array of flaps 331. The flaps 306 that are disposed around the inlet opening 240 allow the pipet 316 to engage and depress one or more of the flaps 306 when dispensing fluid into the sample chamber 210, thereby reducing the possibility that the pipet 316 misaligns during the dispensing process.

FIGS. 14-16 and FIG. 33 illustrate flowcharts for methods of using the hybridization seals 202, 1701 disclosed herein. The order of execution of the blocks may be changed, and/or some of the blocks described may be changed, eliminated, combined and/or subdivided into multiple blocks.

Figure 14:
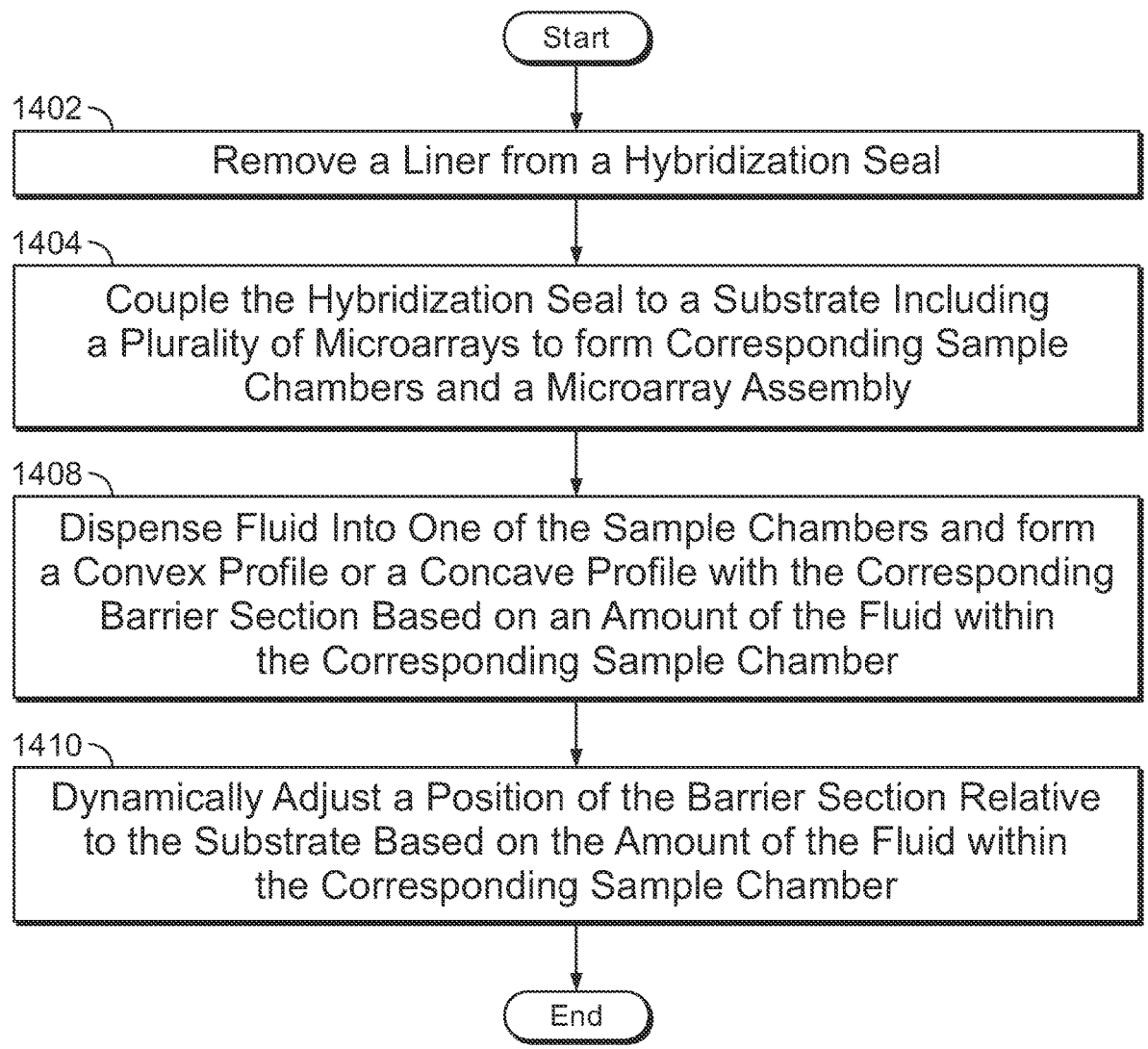
FIG. 14 illustrates a flow chart of a method of assembling and using the microarray assemblies disclosed herein.

The process of FIG. 14 begins with the release liner 226 being removed from the hybridization seal 202 (Block 1402). The release liner 226 may cover the adhesive 207 that is used to couple the hybridization seal 202 and the substrate 102. The hybridization seal 202 is coupled to the substrate 102 including the probes 103 to form the sample chambers 210 and a microarray assembly (Block 1404). The sample chambers 210 may be formed by the layer 206 of the hybridization seal 202 and the substrate 102. In the process of coupling the hybridization seal 202 and the substrate 102, the probes 103 are covered with the barrier section 212 of the evaporation barrier 204. In some implementations, each of the barrier sections 212 includes the inlet opening 240 and one or more of the slits 214. In other implementations, each of the barrier sections 212 includes the inlet opening 240 and the flap 306 that is actuatable to allow access through the inlet opening 240.

At Block 1408, fluid is dispensed into one of the sample chambers 210 and corresponding barrier sections 212 form a convex profile or a concave profile based on an amount of the fluid within the corresponding sample chamber 210 (Block 1408). A position of the barrier section 212 is dynamically adjusted relative to the substrate 102 based on the amount of the fluid within the corresponding sample chamber 210. The microarray assembly may then undergo a hybridization process after which the hybridization seal 202 is removed from the substrate 102 and the substrate 102 is imaged using the system 100 to identify a target molecule of interest within the sample on the substrate 102.

Figure 15:
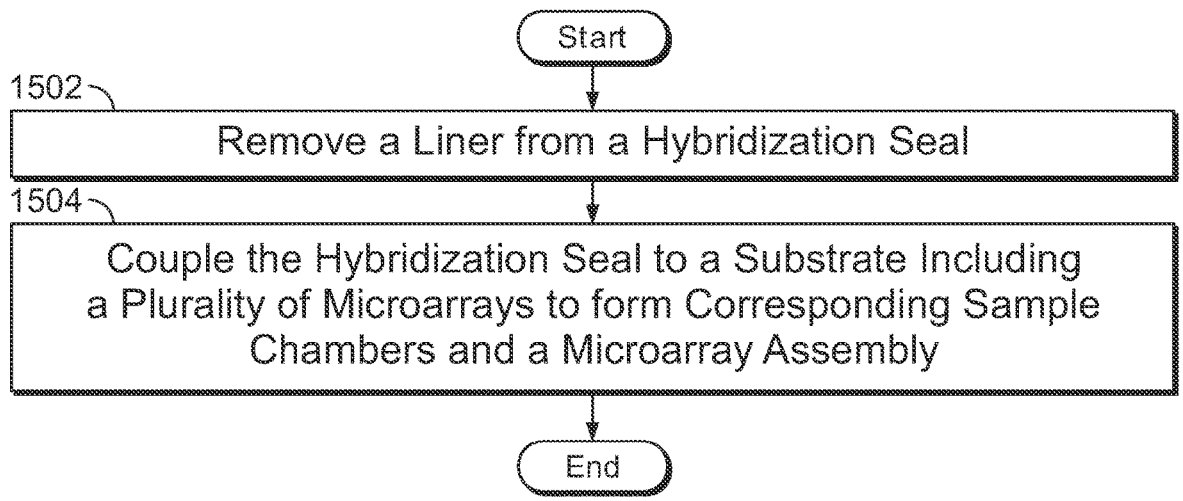
FIG. 15 illustrates another flow chart of a method of assembling the microarray assemblies disclosed herein.

The process of FIG. 15 begins with the release liner 226 being removed from the hybridization seal 202 (Block 1502). The hybridization seal 202 is coupled to the substrate 102 including the probes 103 to form the sample chambers 210 and a microarray assembly (Block 1504). The sample chambers 210 may be formed by the layer 206 of the hybridization seal 202 and the substrate 102. In the process of coupling the hybridization seal 202 and the substrate 102, the probes 103 are covered with the barrier section 212 of the evaporation barrier 204. In some implementations, each of the barrier sections 212 include the inlet opening 240 and one or more of the slits 214. In other implementations, each of the barrier sections 212 include the inlet opening 240 and the flap(s) 306 that is actuatable to allow access through the inlet opening 240. In other implementations, each of the barrier sections 212 include the inlet opening 240 and one or more channels (see, for example, FIGS. 13A, 13B, and 17-29).

Figure 16:
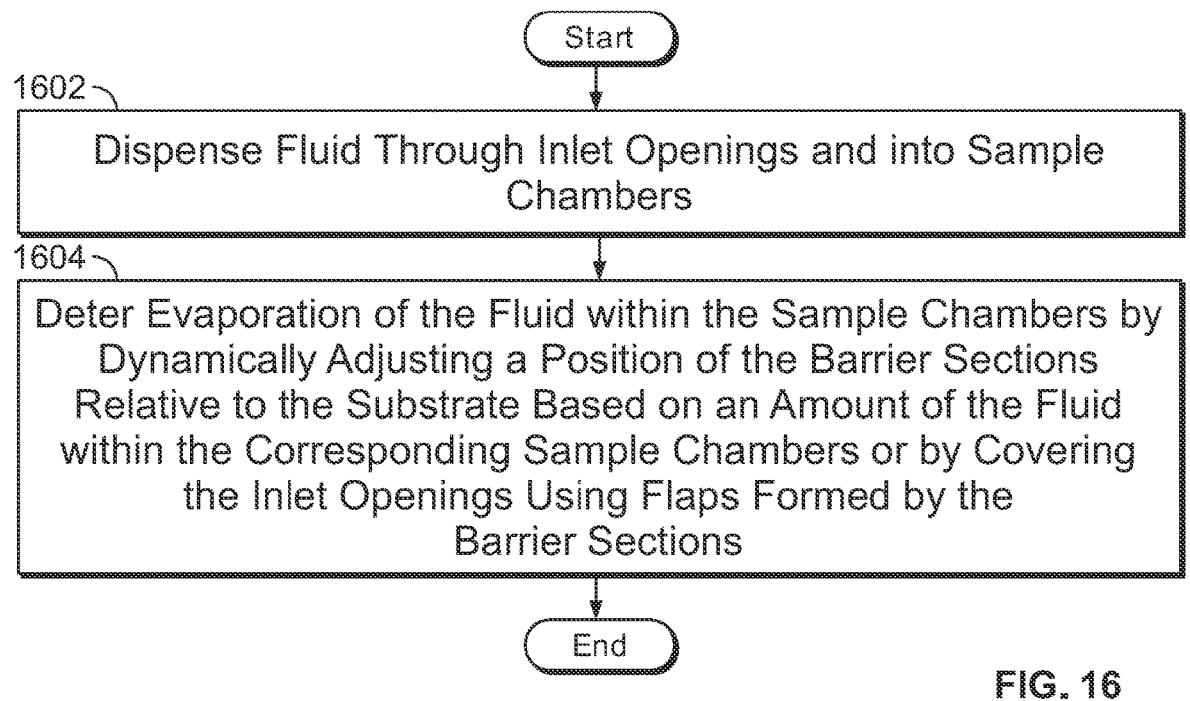
FIG. 16 illustrates another flow chart of a method of using the microarray assemblies disclosed herein.

The method of FIG. 16 begins with fluid being dispensed through the inlet openings 240 and into the sample chambers 210 (Block 1602). The sample chambers 210 are between the substrate 102 and the hybridization seal 202, the substrate 102 includes probes 103, and the hybridization seal 202 includes the evaporation barrier 204 having the barrier sections 212 that cover the probes 103. Evaporation of the fluid within the sample chambers 210 is deterred by dynamically adjusting a position of the barrier sections 212 relative to the substrate 102 based on an amount of the fluid within the corresponding sample chambers 210 or by covering the inlet openings 240 using flap(s) 306 formed by the barrier sections 212. Each of the barrier sections 212 may include one or more slits 214 that may be intersecting slits 322 or arc-shaped slits 308.

Figure 17:
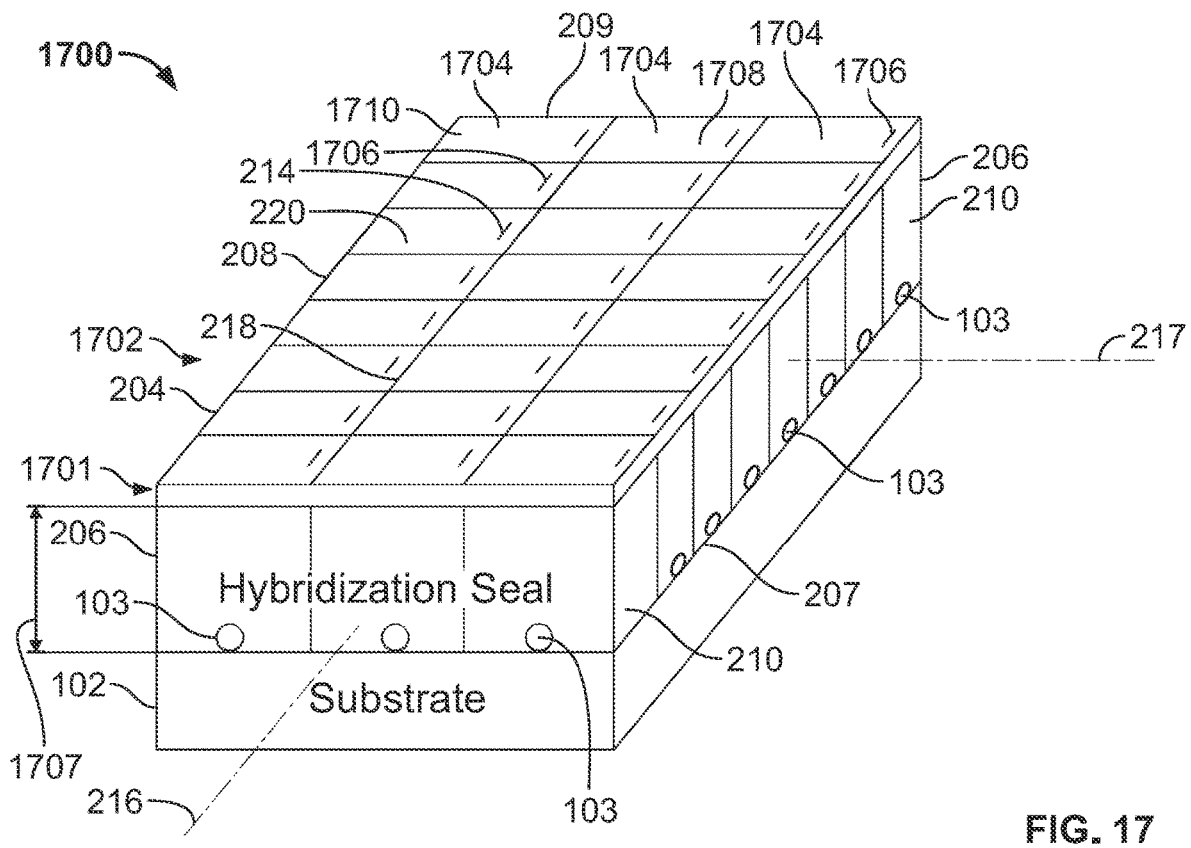
FIG. 17 illustrates an isometric view of another implementation of an example microarray assembly in accordance with the teachings of this disclosure.

FIG. 17 illustrates an isometric view of another implementation of an example microarray assembly 1700 in accordance with the teachings of this disclosure. The assembly 1700 is similar to the assembly 200 of FIG. 2. However, in contrast to the evaporation barrier 204 that includes the slits 214, the microarray assembly 1700 includes a hybridization seal 1701 having an evaporation barrier 1702 that includes barrier sections 1704 that each include more or more channels 1706. The barrier sections 1704 cover probes 103 and one of the sample chambers 210 and may limit evaporation of the sample(s) during a hybridization step of an assay workflow.

In the implementation shown, a height 1707 between the substrate 102 and the evaporation barrier 1702 may be such that surface tension of the fluid deposited within the sample chamber 210 deters the fluid from dispersing within the sample chamber 210. The height 1707 may be between about 240 micrometers ($\mu$m) to about 500 micrometers or another distance. Using the disclosed implementations, the channels 1706 are arranged, and/or configured to reduce the surface tension of the fluid, permit the dispersion of fluid within the corresponding sample chamber 210, improve the flow of fluid within the corresponding sample chamber 210, and/or improve the distribution of the fluid within the corresponding sample chamber 210. To further encourage the fluid to disperse within the sample chamber 210, a surface of the evaporation barrier 1702 that faces toward the substrate 102 may include a hydrophilic coating and/or the evaporation barrier 1702 may have hydrophilic properties. To further encourage the fluid to go into, for example, corresponding inlet openings of the evaporation barrier 1702 and into the sample chamber 210, a surface of the evaporation barrier 1702 that faces away from the substrate 102 may have less hydrophilic properties and/or may have hydrophobic properties and/or a layer (e.g., a thin clear plastic layer) having hydrophobic properties may be included.

In the implementation shown, the channels 1706 are shown at least substantially parallel to the walls 208 that are arranged along the longitudinal axis 216 of the hybridization seal 1701 and at least substantially perpendicular to the walls 209 arranged along the transverse axis 217 of the hybridization seal 202. However, the channels 1706 may be differently arranged. In the implementation shown, the walls 208 form twenty four rectangular sample chambers 210 and the evaporation barrier 1704 may include polyethylene, polyester, polyethylene terephthalate, vinyl, polypropylene, or combinations thereof. However, the assembly 1700 may include a different number of the sample chambers 210, the sample chambers 210 may have a different shape, and/or a different material may be used.

While the channels 1706 are shown arranged in a particular way in FIG. 17, one or more of the barrier sections 1704 may include more than one of the channels 1706 and/or the channel(s) may be differently arranged. For example, the channels 1706 may be at least substantially perpendicular relative to the longitudinal axis 216 and/or one or more channels 1706 may extend between the perimeter 218 of the barrier sections 1704 toward the center 220 of the barrier sections 212 (see, FIGS. 19-27). In yet other examples, the channels 1706 may be angled relative to the walls 208 defining the sample chambers 210 (see, FIGS. 21-24 and 26 and 27) and/or the channels 1706 may be positioned around the perimeter of each of the barrier sections 212 (see, FIGS. 21-24 and 26 and 27).

Additionally or alternatively, the barrier sections 1704 may be heat treated or undergo another treatment such as laser ablation to increase the flexibility of the barrier sections 1704. In some implementations, heat treating the barrier sections 1704 enables the barrier sections 170 to deform and to have a convex profile or a concave profile depending on an amount of the fluid within the corresponding sample chamber 210, thereby preventing or delaying the fluid from evaporating entirely under, for example, an inlet opening of the barrier sections 1704. In some such implementations, the barrier sections 1704 may be selectively heat treated such that a central portion 1708 of each of the barrier sections 1704 has increased flexibility and a perimeter portion 1710 of each of the barrier sections 1704 has relatively more rigidity than the central portions 1708.

Figure 18:
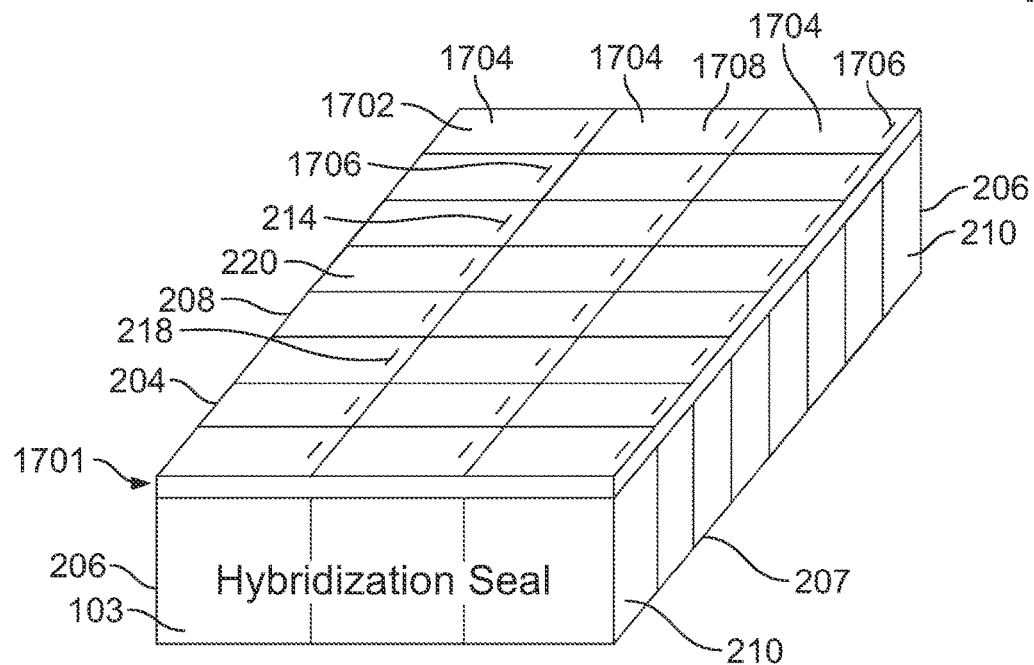
FIG. 18 illustrates an isometric view of the hybridization seal of the microarray assembly of FIG. 17.

FIG. 18 illustrates an isometric view of the hybridization seal 1701 of the microarray assembly 1700 of FIG. 17. In the implementation shown, the hybridization seal 1701 includes the evaporation barrier 1702 having the barrier sections 1704 that each include a channel 1706.

Figure 19:
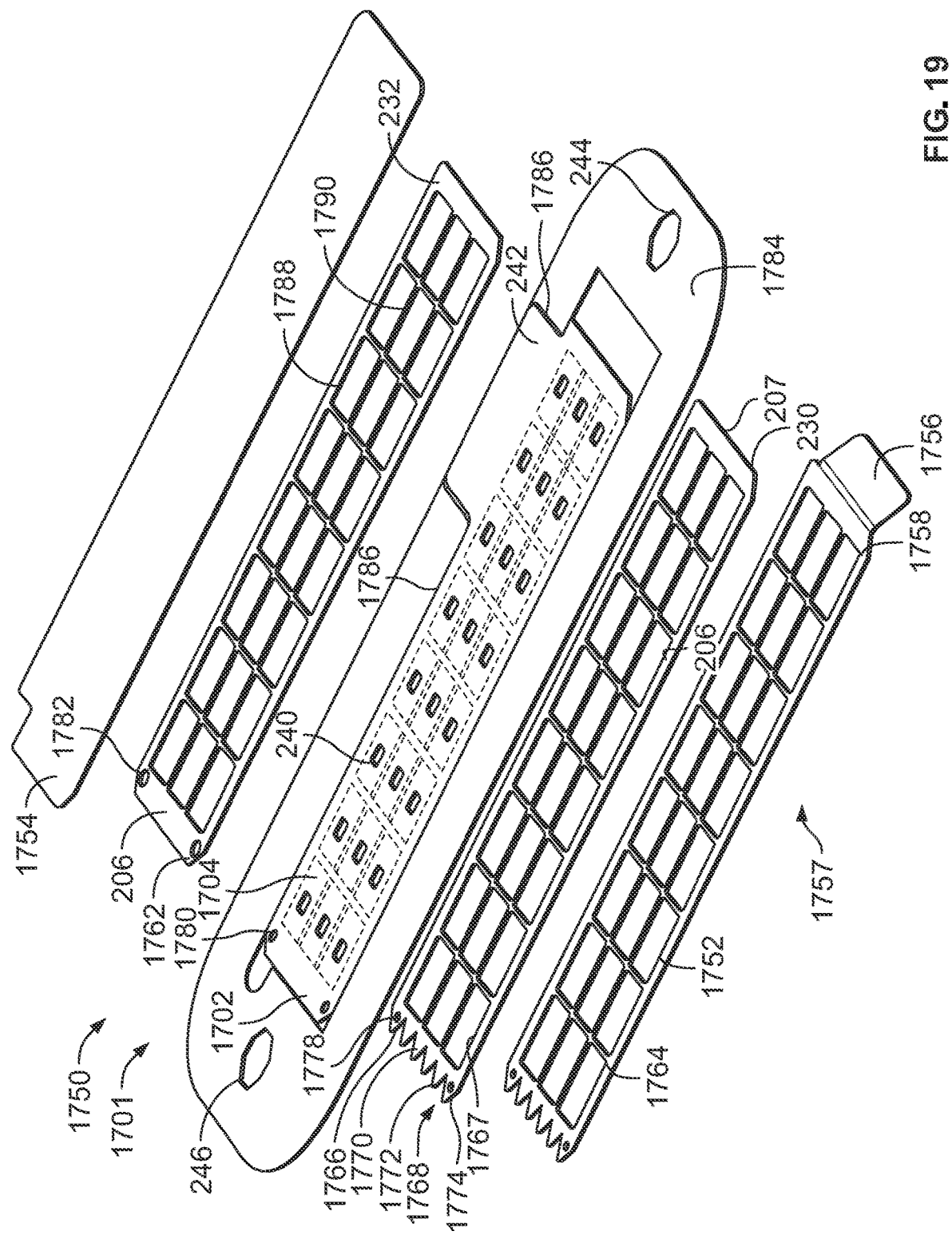
FIG. 19 illustrates an isometric expanded view of an implementation of a hybridization seal assembly that can be used with the hybridization seal of FIGS. 17 and 18.

FIG. 19 illustrates an isometric expanded view of an implementation of a hybridization seal assembly 1750 that can be used with the hybridization seal 1701 of FIGS. 17 and 18. In the implementation shown, the assembly 1750 includes the hybridization seal 1701 including the evaporation barrier 1702, the layer 206, and first and second release liners 1752, 1754 that are couplable to the respective sides 230, 232 of the layer 206. The adhesive 207 is positioned between the first release liner 1752 and the layer 206 and the second release liner 1754 covers a portion of the evaporation barrier 1702. The adhesive 207 may be adapted to form a water-tight seal with the substrate 102 when the hybridization seal 1701 is coupled to the substrate 102 while also being adapted to allow the hybridization seal 1701 to be detached from the substrate 102. The adhesive 207 may be or associated with tape, double-sided tape, glue, etc.

A peel tab 1756 is coupled to the first release liner 1752 at an end 1758 of the first release liner 1752 to enable the first release liner 1752 to be removed from the layer 206. The release liner 1752 and the peel tab 1756 form a release liner assembly 1757. The peel tab 1756 may be coupled to the first release liner 1752 using a permanent adhesive or another type of fastener. Alternatively, the peel tab 1756 may be integral with the first release liner 1752. While a single peel tab 1756 is shown being coupled to the first release liner 1752, more than one peel tab may be included (see, for example, FIG. 30) or the peel tab 1756 may be omitted. In implementations in which two peel tabs 1756 are included, one of the peel tabs 1756 can be coupled to the end 1758 and the other peel tab 1756 can be coupled to the other end 1764 of the first release liner 1752. If the peel tab 1756 is omitted, the first release liner 1752 may be oversized relative to the layer 206 to allow the first release liner 1752 to be easily grasped and removed from the layer 206 by an operator.

Similar to the hybridization seal assembly 224 of FIG. 4, the hybridization seal assembly 1750 of FIG. 19 includes the layer 206 and a second layer 1762 between which the evaporation barrier 1702 is coupled. The layer 206 may be an adhesive, an adhesive multilayer or adhesive and polymer film combination and the second layer 1762 may be a spillover barrier including an adhesive multilayer or adhesive and polymer film combination. Moreover, adhesive may be provided between the layer 206 and the evaporation barrier 1702, between the evaporation barrier 1702 and the second layer 1762, and/or between the second layer 1762 and the second release liner 1754.

In the implementation shown, an end 1767 of the layer 206 includes a plurality of intersecting surfaces 1766 that form a sawtooth profile 1768. Advantageously, the sawtooth profile 1768 enables forces to concentrate at ends 1770 of the sawtooth profile 1768 when the hybridization seal 1701 is being removed from the substrate 102, thereby potentially deterring samples and/or fluid from being inadvertently flung from the substrate 102 during the removal process. Put another way, the sawtooth profile 1768 allows the layer 206 to be more easily removed from the substrate 102. In the implementation shown, central teeth 1772 of the sawtooth profile 1768 may be similar and/or the same and outer teeth 1774 may be similar, the same, or mirror images of one another.

Still referring to the layer 206, the end 1767 of the layer 206 defines a pair of alignment holes 1778, with one of the alignment holes 1178 being defined by one of the outer teeth 1774 and another one of the alignment holes 1178 being defined by the other one of the outer teeth 1774. The evaporation barrier 1702 and the second layer 1762 also include alignment holes 1780, 1782. Thus, the layer 206, the evaporation barrier 1702, and the second layer 1762 include alignment holes 1178, 1780, 1782 that may be used to align the layer 206, the evaporation barrier 1702, and the second layer 1762 relative to one another during, for example, an assembly and/or manufacturing process. Put another way, the alignment holes 1178, 1780, 1782 may facilitate layer-to-layer alignment.

When the layer 206, the evaporation barrier 1702, and the second layer 1762 are coupled, the alignment holes 1178, 1780, 1782 may be concentric with each other to allow the alignment of the layer 206, the evaporation barrier 1702, and the second layer 1762 to be easily inspected. The alignment holes 1178, 1780, 1782 are shown being circular. However, the alignment holes 1178, 1780, 1782 may have another shape and/or may be different from one another. Alternatively, another type of alignment feature may be included. For example, one of the alignment holes 1178, 1780, 1782 may be a square and/or circular and another of the alignment holes 1178, 1780, 1782 may be a cross and/or a crosshair to allow easy visual inspection on whether the alignment features are aligned.

Referring to the evaporation barrier 1702, in the implementation shown, each of the barrier sections 1704 of the evaporation barrier 1702 includes the inlet opening 240 to allow fluid to be dispensed into the corresponding sample chambers 210. The inlet opening 240 may be circular, rectangular, and/or a squircle (intermediate between a square and a circle) and sized to correspond to an outer diameter of a pipet. In some implementations, the inlet openings 240 may be positioned to accommodate the fixed spacing of some multi-channel pipettes. As such, the inlet openings 240 may sometimes be defined in the middle or another location on the barrier sections 1704.

The evaporation barrier 204 also includes the tab 242 that extends out from between the layer and the second layer 1762 and may be grasped by an individual and pulled to uncouple the hybridization seal 1701 from the substrate 102 after the hybridization of an assay workflow. The evaporation barrier 1702 also includes a frame portion 1784 that surrounds at least a portion of the evaporation barrier 1702 and includes frangible couplings 1786 between the frame portion 1784 and the evaporation barrier 1702. The frangible couplings 1786 may be tabs and/or perforations that when broken allow the frame portion 1784 to be removed from about the evaporation barrier 1702. The frame portion 1784 may be removed after the hybridization seal 1701 is coupled to the substrate 102.

Referring to the second layer 1762, the second layer 1762 includes walls 1788 that form a barrier 1790 around the corresponding inlet opening 240. The barrier 1790 may help contain a portion of the fluid (e.g., a convex meniscus) that may protrude out of the inlet opening 240 after the fluid is dispensed into the inlet opening 240.

Figure 20:
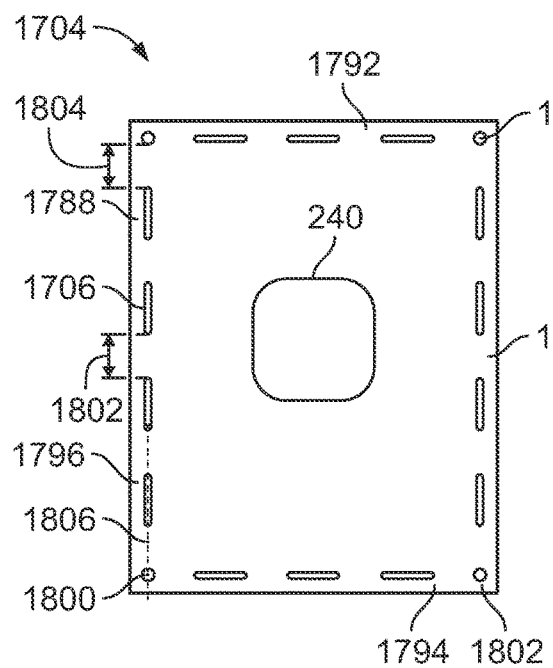
FIG. 20 illustrates a plan view of one of the barrier sections of the hybridization seal assembly of FIG. 19.

FIG. 20 illustrates a plan view of one of the barrier sections 1704 of the hybridization seal 1701 of FIG. 19. In the implementation shown, the barrier section 1704 includes the inlet opening 240 and a plurality of the channels 1706. The inlet opening 240 is shown as a squircle. However, the inlet opening 240 may have any shape (e.g., circular, rectangular).

The channels 1706 of the FIG. 20 are discrete channels 1706 in that the channels 1706 do not intersect each other. Specifically, the barrier section 1704 includes three channels 1706 on a top 1792 and a bottom 1794 of the barrier section 1704 and the barrier section 1704 includes four channels 1706 on a left side 1796 and a right side 1798 of the barrier section 1704. The barrier section 1704 also includes corner vents 1800 that enable gas (air) to be released from the sample and/or the sample chamber 210 and/or may encourage the sample to disperse within the sample chamber 210. In the implementation shown, the spacing between the channels 1706, between the channels 1706 and the wall 1788, and the spacing between the channels 1706 and the corner vent 1800 encourage the sample to disperse within the sample chamber 210. In some implementations, to encourage the sample to disperse within the sample chamber 210, the channels 1706 are spaced a first distance 1802 and the channels 1706 and the corner vent 1800 are spaced a second distance 1804 that is different from (e.g., larger than) the first distance 1802. Moreover, to encourage the sample to disperse within the sample chamber 210, the corner vent 1800 may be offset relative to an axis 1806 of the channels 1706. While each corner 1802 of the barrier section 1704 includes a corresponding corner vent 1800, one or more of the corners 1802 may include a corner vent 1800 or the corner vents 1800 may be omitted.

Figure 21:
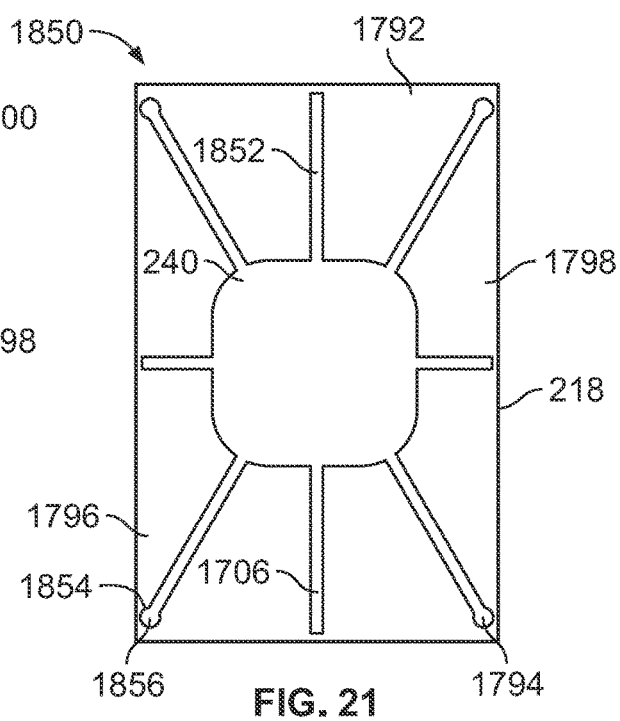
FIG. 21 illustrates a plan view of another implementation of one of the barrier sections that can be used to implement the barrier sections of the hybridization seal assembly of FIGS. 17-19.

FIG. 21 illustrates a plan view of another implementation of one of the barrier sections 1850 that can be used to implement the barrier sections 1704 of the hybridization seal 1701 of FIGS. 17-19. In the implementation shown, the barrier section 1850 includes a plurality of the channels 1706 that are central channels 1852 that connect with or are otherwise coupled to the inlet opening 240 and are spaced from a perimeter 218 of the barrier section 1850.

Some of the central channels 1852 are at least substantially parallel or at least substantially perpendicular relative to the sides 1792, 1794, 1796, 1798 of the barrier section 1850 and some of the central channels 1852 are angled relative to the sides 1792, 1794, 1796, 1798 of the barrier section 1850. The channels that are angled are shown having ends 1854 that have an enlarged opening 1856 relative to a width of the remainder of the corresponding channel 1852. As shown, the enlarged opening 1856 is semi-circular and, thus, the end 1854 of some of the central channels 1852 is semi-circular. However, the enlarged opening 1856 may have a different shape.

Figure 22:
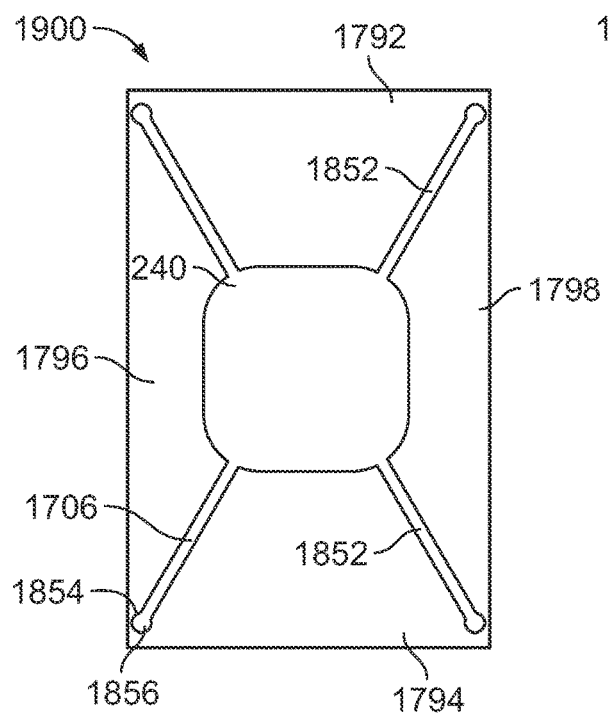
FIG. 22 illustrates a plan view of another implementation of one of the barrier sections that can be used to implement the barrier sections of the hybridization seal assembly of FIGS. 17-19.

FIG. 22 illustrates a plan view of another implementation of one of the barrier sections 1900 that can be used to implement the barrier sections 1704 of the hybridization seal 1701 of FIGS. 17-19. The barrier section 1900 of FIG. 22 is similar to the barrier section 1850 of FIG. 21. However, in contrast, the central channels 1852 that are at least substantially parallel or at least substantially perpendicular relative to the sides 1792, 1794, 1796, 1798 of the barrier section 1850 are omitted.

Figure 23:
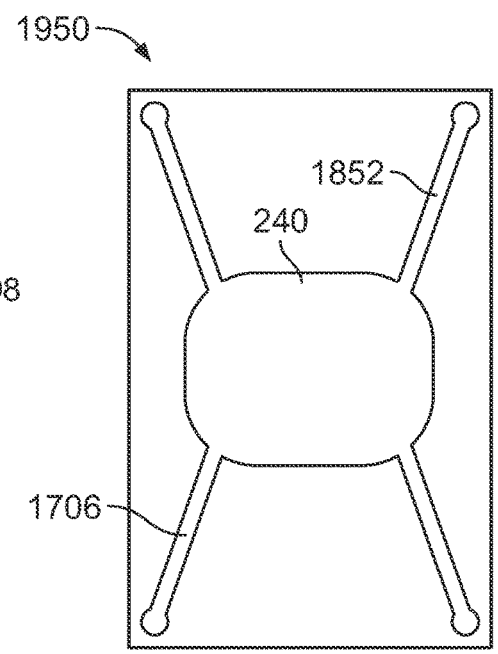
FIG. 23 illustrates a plan view of another implementation of one of the barrier sections that can be used to implement the barrier sections of the hybridization seal assembly of FIGS. 17-19.

FIG. 23 illustrates a plan view of another implementation of one of the barrier sections 1950 that can be used to implement the barrier sections 1704 of the hybridization seal 1701 of FIGS. 17-19. The barrier section 1950 of FIG. 23 is similar to the barrier section 1900 of FIG. 22. However, in contrast, the inlet opening 240 of the barrier section 1950 of FIG. 23 have sides of different length such that the inlet opening 240 is oblong.

Figure 24:
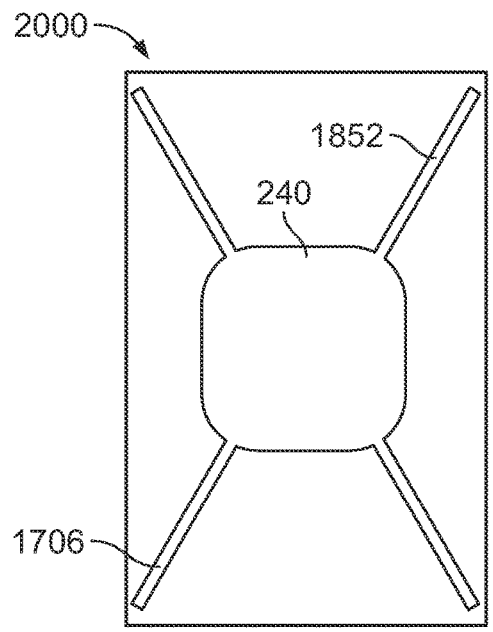
FIG. 24 illustrates a plan view of another implementation of one of the barrier sections that can be used to implement the barrier sections of the hybridization seal assembly of FIGS. 17-19.

FIG. 24 illustrates a plan view of another implementation of one of the barrier sections 2000 that can be used to implement the barrier sections 1704 of the hybridization seal 1701 of FIGS. 17-19. The barrier section 2000 of FIG. 24 is similar to the barrier section 1900 of FIG. 22. However, in contrast, the central channels 1852 of the barrier section 1950 do not include the enlarged openings 1856.

Figure 25:
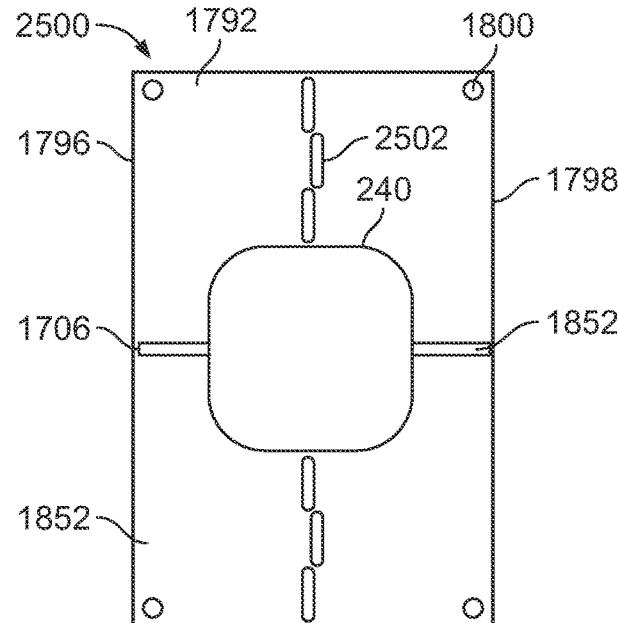
FIG. 25 illustrates a plan view of another implementation of one of the barrier sections that can be used to implement the barrier sections of the hybridization seal assembly of FIGS. 17-19.

FIG. 25 illustrates a plan view of another implementation of one of the barrier sections 2500 that can be used to implement the barrier sections 1704 of the hybridization seal 1701 of FIGS. 17-19. The barrier section 2500 of FIG. 25 is similar to the barrier section 1850 of FIG. 21. However, in contrast, the barrier section 2500 of the FIG. 25 includes the corner vents 1800 and channels 2502 that are staggered relative to one another. The staggered channels 2502 are at least substantially parallel or at least substantially perpendicular relative to the sides 1792, 1794, 1796, 1798 of barrier section 1850. In the implementation shown, three of the channels 2502 are positioned between the inlet opening 240 and the top 1792 of the barrier section 2500 and three of the channels 2502 are positioned between the inlet opening 240 and the bottom 1794 of the barrier section 2500. However, any number of channels 2502 may be included.

Figure 26:
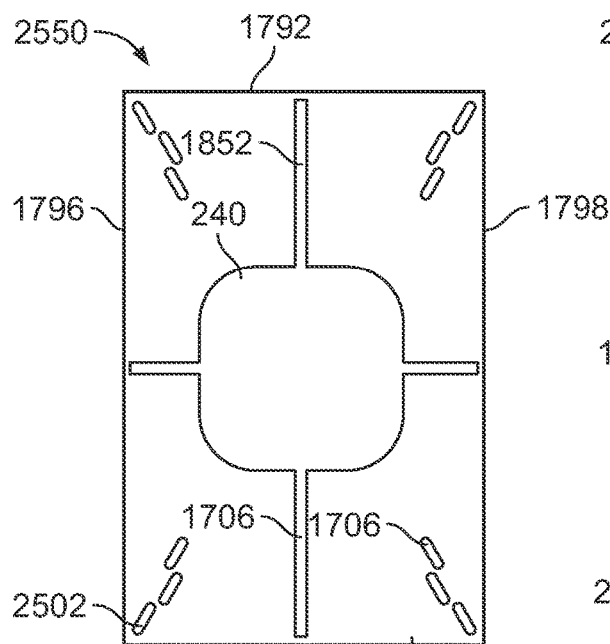
FIG. 26 illustrates a plan view of another implementation of one of the barrier sections that can be used to implement the barrier sections of the hybridization seal assembly of FIGS. 17-19.

FIG. 26 illustrates a plan view of another implementation of one of the barrier sections 2550 that can be used to implement the barrier sections 1704 of the hybridization seal 1701 of FIGS. 17-19. The barrier section 2550 of FIG. 26 is similar to the barrier section 1850 of FIG. 21. However, in contrast, the channels 1706 that are angled relative to the sides 1792, 1794, 1796, 1798 of the barrier section 1850 do not connect to the inlet opening 240 and are staggered channels 2502.

Figure 27:
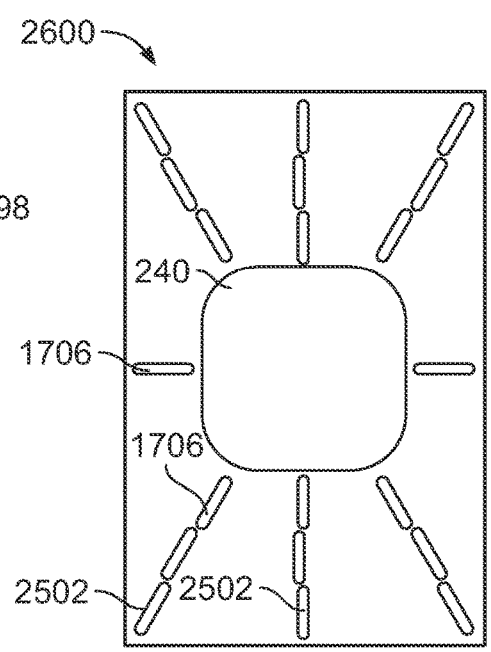
FIG. 27 illustrates a plan view of another implementation of one of the barrier sections that can be used to implement the barrier sections of the hybridization seal assembly of FIGS. 17-19.

FIG. 27 illustrates a plan view of another implementation of one of the barrier sections 2600 that can be used to implement the barrier sections 1704 of the hybridization seal 1701 of FIGS. 17-19. The barrier section 2600 of FIG. 27 is similar to the barrier section 1850 of FIG. 21. However, in contrast, each of the channels 1706 are formed as staggered channels 2502 that do not connect to the inlet opening 240.

Figure 28:
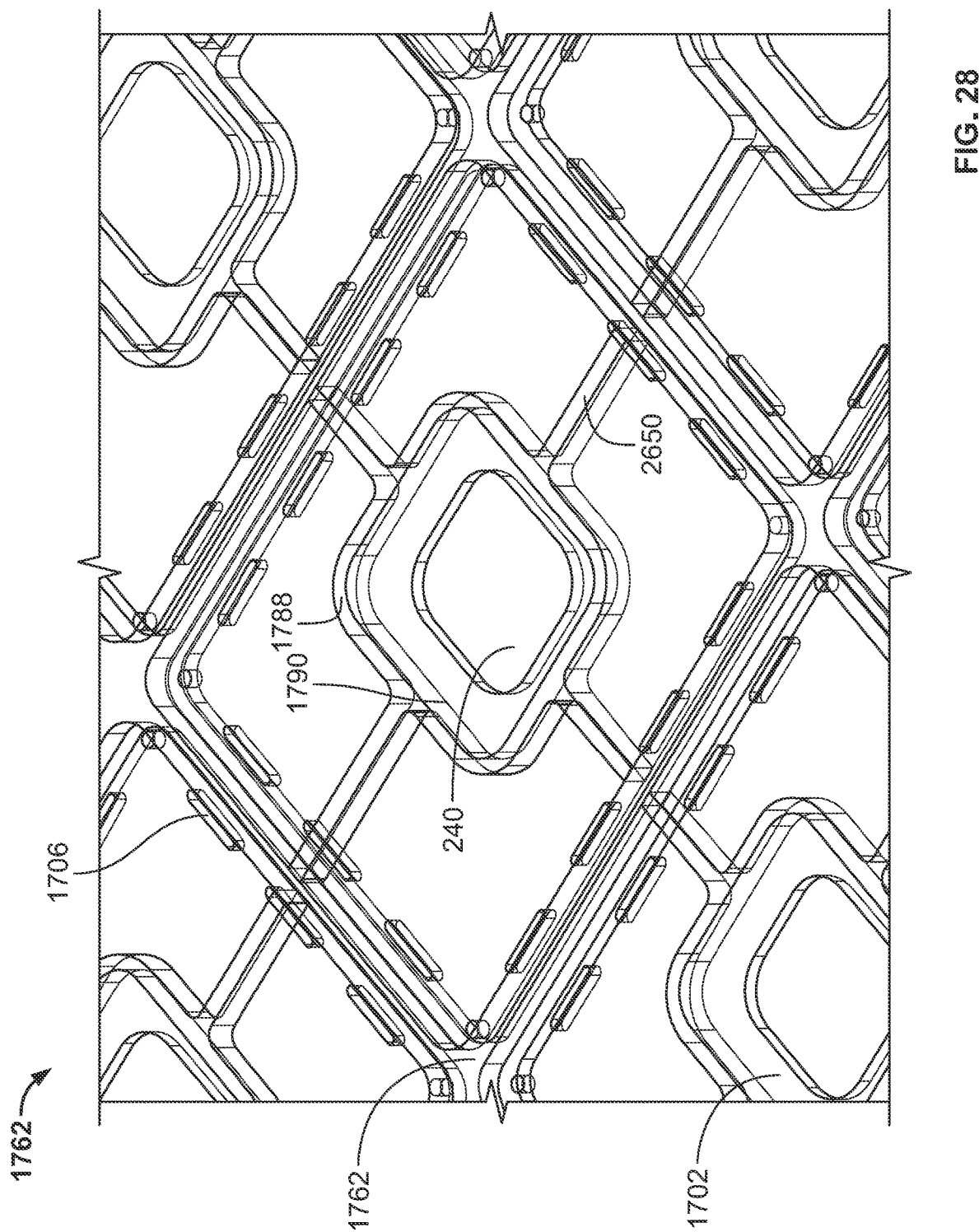
FIG. 28 illustrates a detailed isometric view of an alternative implementation of the second layer and the evaporation barrier that can be used with the hybridization seal assembly of FIGS. 17-19.

FIG. 28 illustrates a detailed isometric view of an alternative implementation of the second layer 1762 and the evaporation barrier 1702 that can be used with the hybridization seal 1701 of FIGS. 17-19. In the implementation shown, the second layer 1762 includes the walls 1788 that, with the evaporation barrier 1702, form the barrier 1790 around the inlet opening 240. The evaporation barrier 1702 includes channels 2650 that extend from the walls 1788 and facilitate manufacturability. While the channels 2650 are shown being included, in other implementations, the channels 2650 may be omitted.

Figure 29:
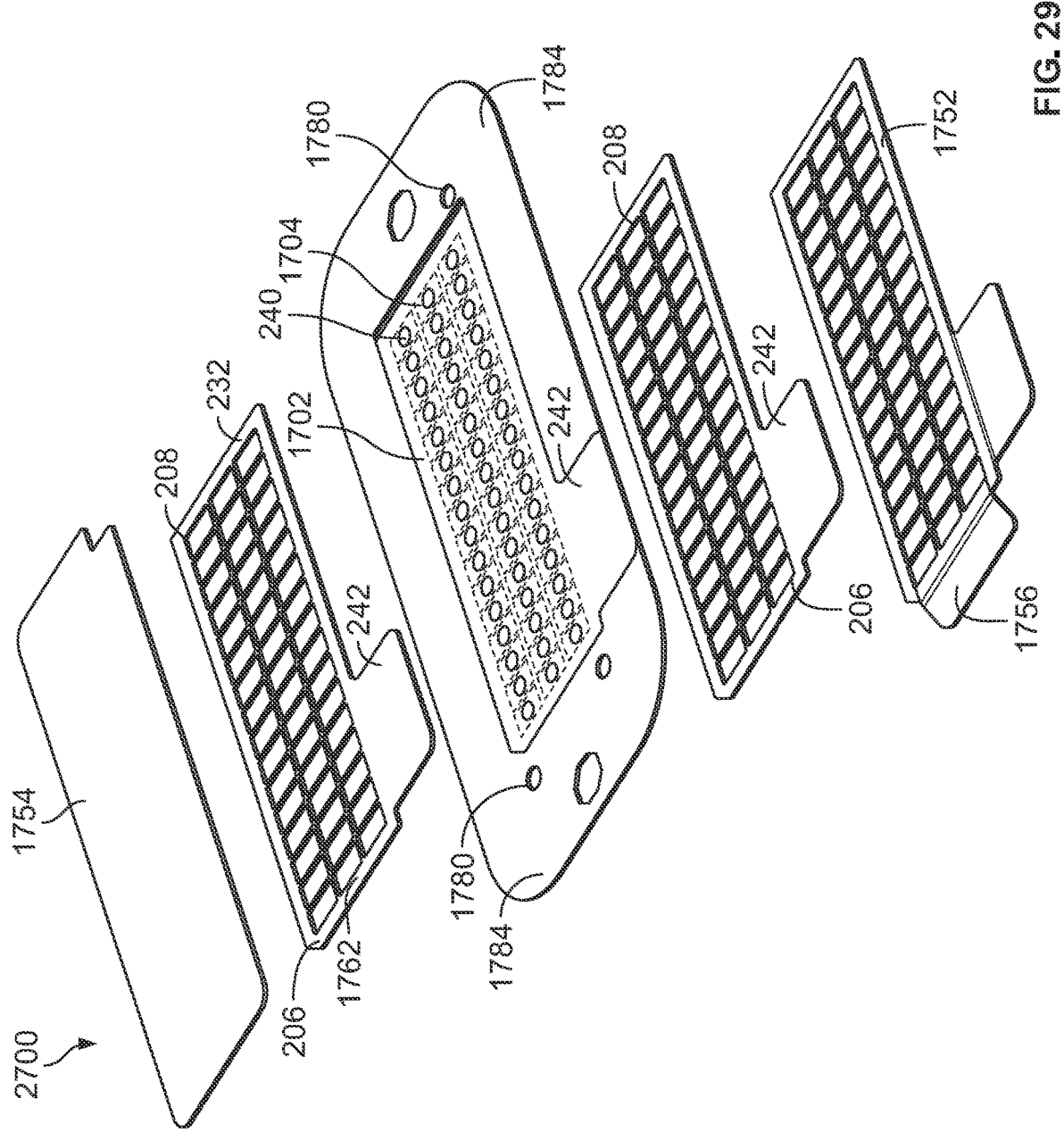
FIG. 29 illustrates an isometric expanded view of an implementation of another hybridization seal assembly that can be used with the hybridization seal of FIGS. 17 and 18.

FIG. 29 illustrates an isometric expanded view of an implementation of another hybridization seal assembly 2700 that can be used with the hybridization seal 1701 of FIGS. 17 and 18. The hybridization seal assembly 2700 of FIG. 29 is similar to the hybridization seal assembly 1750 of FIG. 19. However, in contrast, the hybridization seal assembly 2700 of FIG. 29 has more barrier sections 1704 and the frame 206 has the walls 208 that form a corresponding number of sample chambers 210. In the implementation shown, forty eight barrier sections 1704 are provided. However, any number of barrier sections may be included. Additionally, in contrast to the hybridization seal assembly 1750 of FIG. 19, the layer 206 and the second layer 1762 include the tabs 242 and the frame portion 1784 that surrounds the evaporation barrier 1702 includes the alignment holes 1780 as opposed to the evaporation barrier 1702 itself including the alignment holes. Also, while the layer 206 of FIG. 29 does not include the intersecting surfaces 1766 that form the sawtooth profile 1768, the layer 206 of FIG. 29 may alternatively include the intersecting surfaces 1766 that form the sawtooth profile 1768.

Figure 30:
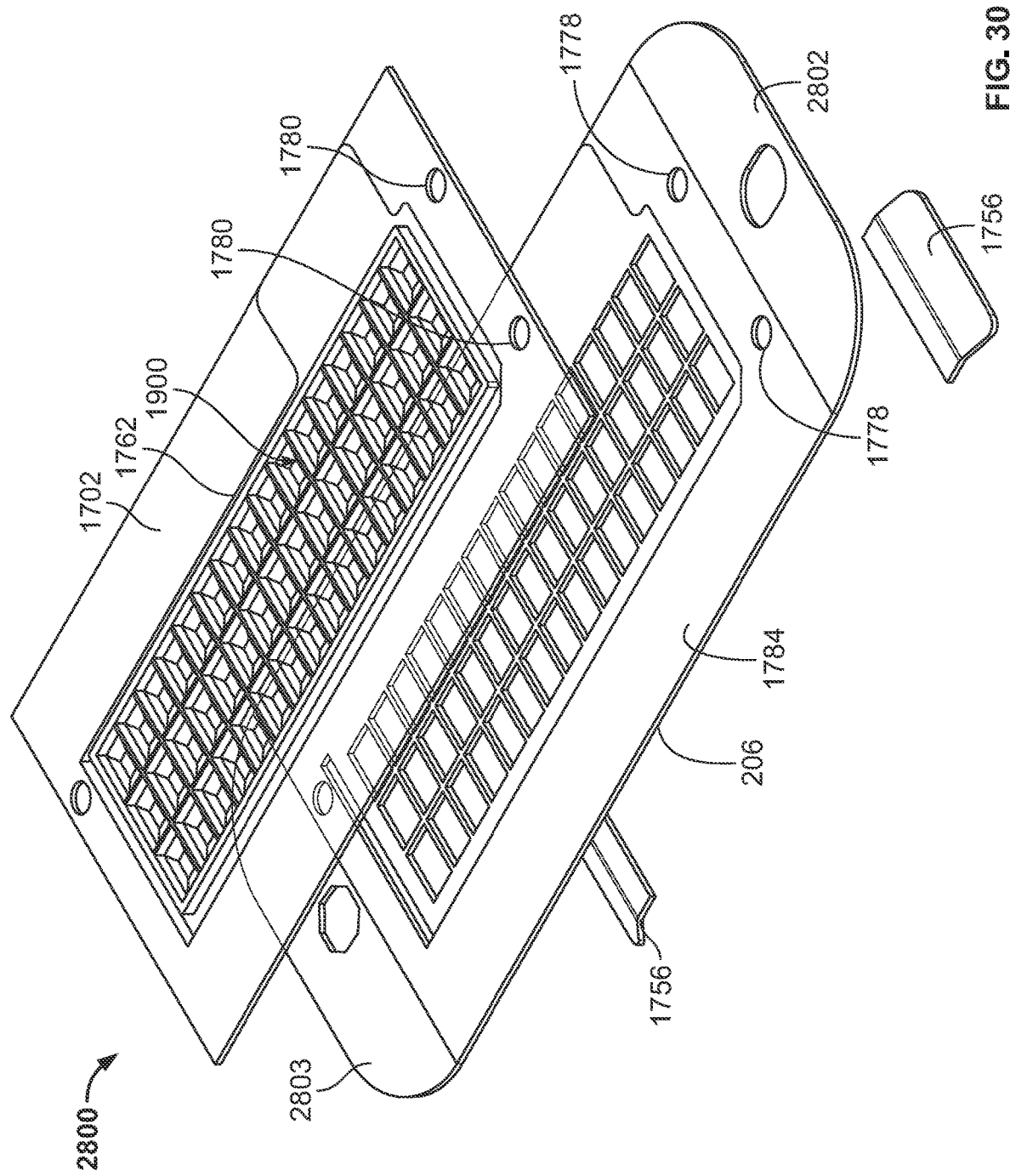
FIG. 30 illustrates an isometric expanded view of an implementation of another hybridization seal assembly that can be used with the hybridization seal of FIGS. 17 and 18.

FIG. 30 illustrates an isometric expanded view of an implementation of another hybridization seal assembly 2800 that can be used with the hybridization seal 1701 of FIGS. 17, and 18. The hybridization seal assembly 2800 of FIG. 30 is similar to the hybridization seal assembly 2700 of FIG. 29. However, in contrast, the hybridization seal assembly 2800 of FIG. 30 includes the second layer 1762 that is coupled to the evaporation barrier 1702 by, for example, an overmolding process. The overmolding process may include a silicone injection overmolding process. However, the evaporation barrier 1702 and the second layer 1762 may be coupled in any suitable way. By coupling the second layer 1762 and the evaporation barrier 1702 by overmolding, alignment issues between the second layer 1762 and the evaporation barrier 1702 may be removed or reduced. In some implementations, the second layer 1762 is made of rubber such as silicone rubber and the evaporation barrier 1702 is made from plastic that may be relatively soft and can be overmolded. However, the second layer 1762 and/or the evaporation barrier 1702 may be made of any suitable material.

Additionally, in contrast to the hybridization seal assembly 2700 of FIG. 29, the layer 206 of FIG. 30 includes two peel tabs 1756 that are arranged to be coupled to the layer 206 at opposing ends 2802, 2803 of the layer 206. Alternatively, a single peel tab 1756 may be included or the peal tabs 1756 may be omitted.

Figure 31:
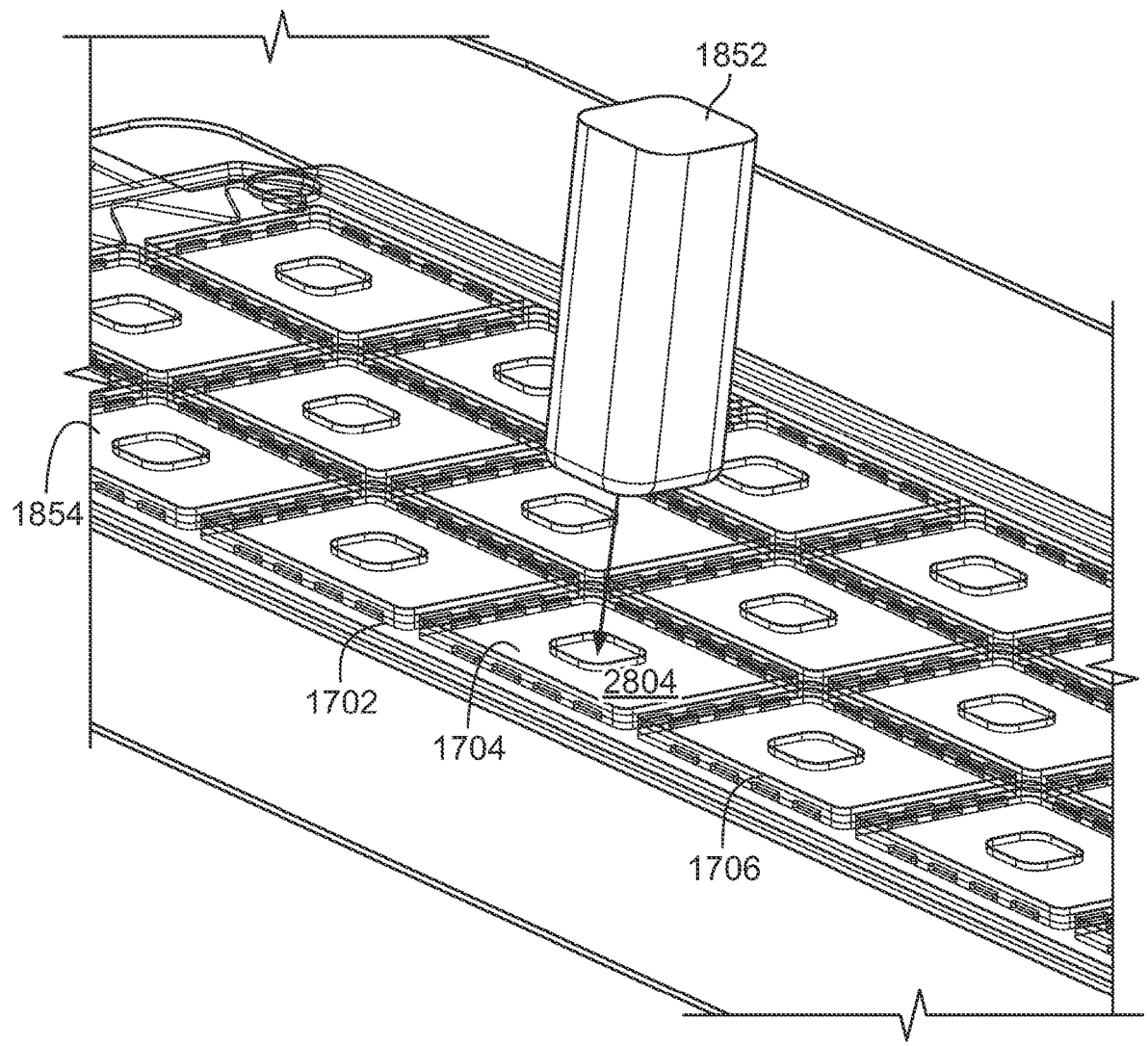
FIG. 31 illustrates a process of heat treating a portion of the barrier section of the evaporation barrier of FIG. 19 using a tool.

FIG. 31 illustrates a process of heat treating a portion 2804 of the barrier section 1704 of the evaporation barrier 1702 of FIG. 19 using a tool 2852. The tool 2852 may be a heated mechanical stamp. Advantageously, heat treating the portion 2804 allows the barrier sections 1704 to have a convex profile or a concave profile depending on an amount of the fluid within the corresponding sample chamber 210. Put another way, locally heat treating the barrier sections 1702 allows the barrier sections 1702 to continue to maintain contact with the fluid within the sample chamber 210, thereby minimizing contact between the fluid and air and reducing a rate of evaporation. In the implementation shown, the barrier sections 1702 may be made of PET, has a perimeter 2854 that is relatively rigid, and includes the channels 1706. Alternatively, the channels 1706 may be omitted.

Figure 32:
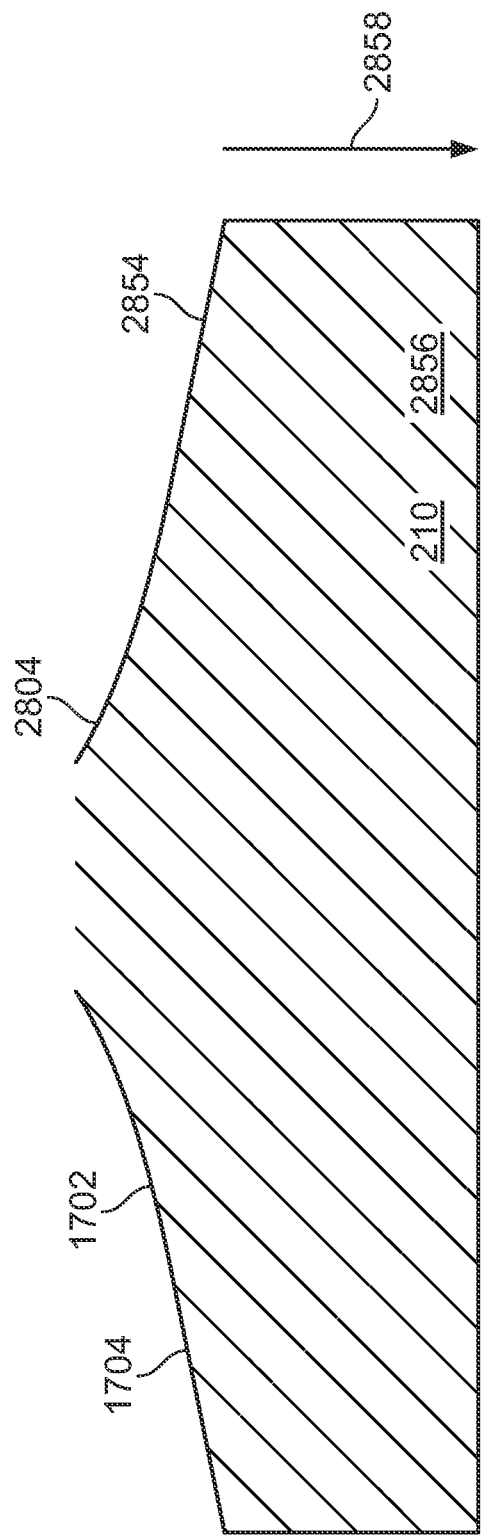
FIG. 32 shows a cross-sectional schematic illustration of the barrier section of FIG. 31 covering the sample chamber containing fluid.

FIG. 32 shows a cross-sectional schematic illustration of the barrier section 1704 of FIG. 31 covering the sample chamber 210 containing fluid 2856. In the implementation shown and based on a portion 2804 of the barrier section 1704 being locally heat treated/stressed, the portion 2804 forms a convex/volcano profile. Conversely, if the fluid 2856 evaporates, the portion 2804 can move in a direction generally indicated by arrow 2858, thereby allowing contact between the barrier section 1704 and the fluid 2856 to be maintained.

Figure 33:
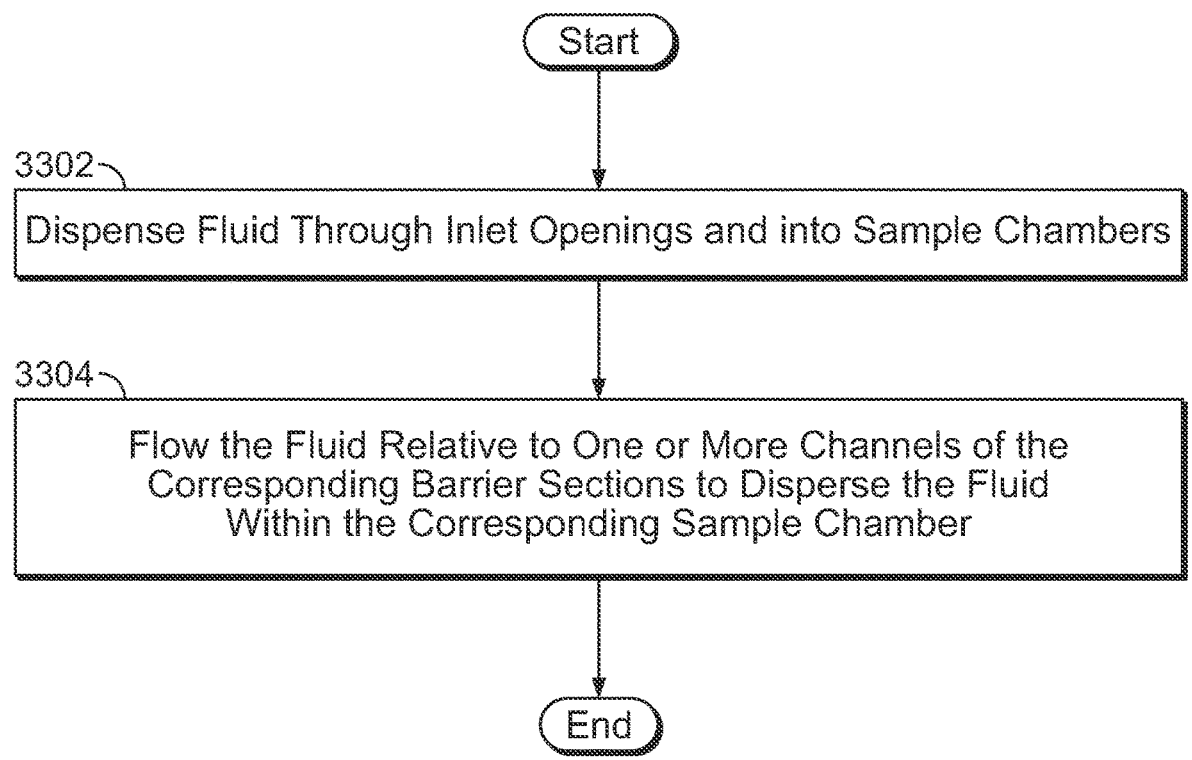
FIG. 33 illustrates another flow chart of a method of using the microarray assemblies disclosed herein.

The method of FIG. 33 begins dispensing fluid being dispensed through inlet openings 240 and into sample chambers 210 (Block 3302) The sample chambers 210 are between the substrate 102 and the hybridization seal 1701, the substrate 102 includes probes 103, and the hybridization seal 1701 includes an evaporation barrier 1702 having barrier sections 1704 that cover the probes 103. The fluid is flowed relative to one or more channels 1706 of the corresponding barrier sections 1704 to disperse the fluid within the corresponding sample chamber 210 (Block 3304). In some implementations, flowing the fluid relative to the one or more channels 1706 increases and/or maximize an amount that the substrate 102 is covered by the fluid. In some implementations, the channels 1706 are angled relative to the walls 1788 defining the sample chambers 210. In some implementations, the channels 1706 are positioned around at least a portion of the perimeter 218 of each of the barrier sections 1704. In other implementations, one or more channels 1706 are at least substantially parallel or at least substantially perpendicular relative to the walls 1788 defining the sample chambers 210.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or process recited in the singular and proceeded with the word "a" or "an" should be understood as not excluding plural of said elements or processes, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising," "including," or "having" an element or a plurality of elements having a particular property may include additional elements whether or not they have that property. Moreover, the terms "comprising," including," having," or the like are interchangeably used herein.

The terms "substantially," "approximately," and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

What is claimed is:

1. An apparatus, comprising:
   a substrate including a plurality of probes; and
   a hybridization seal, comprising:
      an evaporation barrier; and
      a layer including walls that form a grid pattern and define a plurality of sample chambers that are to receive fluid, the layer includes a first side removably coupled to the substrate and a second side coupled to the evaporation barrier,
      wherein the evaporation barrier includes barrier sections that cover the probes and includes one or more slits,
      wherein the layer has an end that comprises a plurality of intersecting surfaces that form a sawtooth profile.

2. The apparatus of claim 1, wherein the evaporation barrier is substantially rigid.

3. The apparatus of claim 1, wherein the slits are positioned around a perimeter of each of the barrier sections.

4. The apparatus of claim 1, further including a second layer and wherein the evaporation barrier is coupled between the layer and the second layer.

5. The apparatus of claim 4, wherein the layer comprises an adhesive multi-layer and the second layer comprises a barrier layer.

6. The apparatus of claim 1, wherein a surface of the evaporation barrier that faces toward the substrate includes at least one of a hydrophilic coating or has hydrophilic properties.

7. The apparatus of claim 4, wherein the layer, the evaporation barrier, and the second layer comprise alignment holes.

8. The apparatus of claim 7, wherein the alignment holes of the layer, the evaporation barrier, and the second layer are concentric.

9. The apparatus of claim 1, wherein the slits reduce a rigidity of the corresponding barrier sections.

10. An apparatus, comprising:
    an evaporation barrier; and
    a layer including walls that form a grid pattern that define a plurality of sample chambers that are to receive fluid, the layer includes a first side and a second side, the second side coupled to the evaporation barrier,
    wherein the evaporation barrier includes barrier sections that include one or more slits,
    wherein a portion of each of the barrier sections is heat treated, wherein the heat treating of the portion of each of the barrier sections enables deformation that allows the barrier sections to have a convex profile or a concave profile depending on an amount of fluid within a corresponding sample chamber.

11. The apparatus of claim 10, wherein a second layer includes walls that form a barrier around inlet openings.

12. The apparatus of claim 10, wherein each of the barrier sections includes corner vents.

13. The apparatus of claim 10, further including a second layer and wherein the evaporation barrier is coupled between the layer and the second layer.

14. The apparatus of claim 10, wherein each barrier section further comprises staggered slits that are staggered relative to one another.

15. The apparatus of claim 10, further comprising a release liner assembly comprising a release liner coupled to a first side of the layer and a peel tab coupled to the release liner to enable the release liner to be removed from the layer.

16. The apparatus of claim 10, wherein the slits allow each barrier section to have a convex profile or a concave profile based on an amount of the fluid within a corresponding sample chamber.

17. The apparatus of claim 10, wherein each of the barrier sections includes one or more slits that surround an inlet opening.

18. An apparatus, comprising:
    a substrate including a plurality of probes; and
    a hybridization seal, comprising:
       an evaporation barrier; and
       a layer including walls that form a grid pattern and define a plurality of sample chambers that are to receive fluid, the layer includes a first side removably coupled to the substrate and a second side coupled to the evaporation barrier,
    wherein the evaporation barrier includes barrier sections that cover the probes, wherein each barrier section includes an inlet opening and a plurality of slits,
    wherein a portion of each of the barrier sections is heat treated, wherein the heat treating of the portion of each of the barrier sections enables deformation that allows the barrier sections to have a convex profile or a concave profile depending on an amount of the fluid within the corresponding sample chamber.

19. The apparatus of claim 18, wherein the layer has an end that comprises a plurality of intersecting surfaces that form a sawtooth profile.

20. The apparatus of claim 18, wherein the layer comprises an adhesive multi-layer, further including a barrier layer, wherein the evaporation barrier is coupled between the adhesive multi-layer and the barrier layer.

* * * * *